United States Patent
Jang et al.

(10) Patent No.: US 8,923,240 B2
(45) Date of Patent: Dec. 30, 2014

(54) METHOD FOR TRANSMITTING CONTROL INFORMATION IN WIRELESS COMMUNICATION SYSTEM AND APPARATUS THEREFOR

(71) Applicant: LG Electronics Inc., Seoul (KR)

(72) Inventors: Jiwoong Jang, Sungnam-si (KR); Moonil Lee, Yongin-si (KR); Jaehoon Chung, Yongin-si (KR); Seunghee Han, Anyang-si (KR); Hyunsoo Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/267,539

(22) Filed: May 1, 2014

(65) Prior Publication Data

US 2014/0301313 A1    Oct. 9, 2014

Related U.S. Application Data

(63) Continuation of application No. 13/163,586, filed on Jun. 17, 2011, now Pat. No. 8,750,223.

(60) Provisional application No. 61/375,288, filed on Aug. 20, 2010, provisional application No. 61/376,164, filed on Aug. 23, 2010, provisional application No.

(Continued)

(30) Foreign Application Priority Data

Mar. 28, 2011    (KR) ........................ 10-2011-0027555

(51) Int. Cl.
*H04W 4/00*  (2009.01)
*H04W 72/04*  (2009.01)
*H04L 1/00*  (2006.01)
*H04L 5/00*  (2006.01)
*H04L 1/18*  (2006.01)

(52) U.S. Cl.
CPC ........... *H04W 72/042* (2013.01); *H04L 1/0042* (2013.01); *H04L 1/0067* (2013.01);
(Continued)

(58) Field of Classification Search
None
See application file for complete search history.

(56) References Cited

U.S. PATENT DOCUMENTS

2008/0192705 A1    8/2008    Suzuki
2008/0192847 A1    8/2008    Classon et al.
(Continued)

FOREIGN PATENT DOCUMENTS

| CN | 101132230 | 2/2008 |
|---|---|---|
| JP | 2009545276 | 12/2009 |
| WO | 2010082757 | 7/2010 |

OTHER PUBLICATIONS

The State Intellectual Property Office of the People's Republic of China Application Serial No. 201110172610.6, Office Action dated Sep. 3, 2013, 8 pages.

(Continued)

*Primary Examiner* — Nicholas Sloms
(74) *Attorney, Agent, or Firm* — Lee, Hong, Degerman, Kang & Waimey

(57) ABSTRACT

A method for transmitting information data by using a Reed-Muller coding scheme in a wireless communication system is disclosed. The method includes the steps of dividing the information data to first information data and second information data if a bit size O of the information data is equal to or larger than a predetermined number; applying RM coding on each of the first information data and the second information data; concatenating the coded first information data and the coded second information data, and transmitting the concatenated data.

14 Claims, 19 Drawing Sheets

Related U.S. Application Data

61/392,486, filed on Oct. 13, 2010, provisional application No. 61/406,153, filed on Oct. 24, 2010, provisional application No. 61/406,562, filed on Oct. 25, 2010, provisional application No. 61/409,960, filed on Nov. 4, 2010, provisional application No. 61/376,996, filed on Aug. 25, 2010, provisional application No. 61/387,011, filed on Sep. 28, 2010, provisional application No. 61/414,377, filed on Nov. 16, 2010, provisional application No. 61/407,891, filed on Oct. 28, 2010, provisional application No. 61/412,792, filed on Nov. 12, 2010, provisional application No. 61/413,934, filed on Nov. 15, 2010.

(52) U.S. Cl.
CPC .............. *H04L 1/0073* (2013.01); *H04L 5/001* (2013.01); *H04L 5/0053* (2013.01); *H04L 5/0055* (2013.01); *H04L 5/0057* (2013.01); *H04L 1/0031* (2013.01); *H04L 1/1861* (2013.01); *H04L 5/0023* (2013.01); *H04L 5/0044* (2013.01); *H04L 5/0048* (2013.01)
USPC .......................... 370/329; 370/280; 455/452.1

(56) References Cited

U.S. PATENT DOCUMENTS

2009/0201875 A1* 8/2009 Hasegawa et al. ............ 370/329
2009/0219911 A1   9/2009 Blankenship et al.
2009/0286482 A1* 11/2009 Gorokhov et al. ........... 455/63.1

OTHER PUBLICATIONS

Ericsson, et al., "UCI on PUSCH," R1-103522, 3GPP TSG RAN WG1 Meeting #61bis, Jun. 2010, 3 pages.

Samsung, "HARQ-ACK and RI Multiplexing in SIMO PUSCH for DL CA," 3GPP TSG RAN WG1 #61bis, R1-103650, Jun. 2010, 3 pages.

ZTE, "Large ACK/NACK payload in support of CA in TDD," 3GPP TSG RAN WG1 Meeting #62bis, R1-105714, Oct. 2010, 6 pages.

CMCC, et al., "Way Forward on Supporting ACK/NAK Payload Larger than 11 Bits in Rel-10 TDD," TSG-RAN WG1 Meeting #62bis, R1-105776, Oct. 2010, 2 pages.

Huawei, et al., "Coding and resource mapping for UCI on PUSCH," 3GPP TSG RAN WG1 Meeting #63, R1-106446, Nov. 2010, 6 pages.
LG Electronics, "Channel coding for UCI on PUSCH," 3GPP TSG RAN WG1 #63, R1-106106, Nov. 2010, 4 pages.

European Patent Office Application Serial Number 11003864.3, Search Report dated Oct. 27, 2014, 10 pages.

* cited by examiner

-- Prior Art --

-- Prior Art --

(a)

(b)

METHOD FOR TRANSMITTING CONTROL INFORMATION IN WIRELESS COMMUNICATION SYSTEM AND APPARATUS THEREFOR

CROSS-REFERENCE TO RELATED APPLICATIONS

This application is a continuation of U.S. patent application Ser. No. 13/163,586, filed on Jun. 17, 2011, now U.S. Pat. No. 8,750,223, which claims the benefit of earlier filing date and right of priority to Korean Patent Application No. 10-2011-0027555, filed on Mar. 28, 2011, and also claims the benefit of U.S. Provisional Application Ser. Nos. 61/414,377, filed on Nov. 16, 2010, 61/413,934, filed on Nov. 15, 2010, 61/412,792, filed on Nov. 12, 2010, 61/409,960, filed on Nov. 4, 2010, 61/407,891, filed on Oct. 28, 2010, 61/406,562, filed on Oct. 25, 2010, 61/406,153, filed on Oct. 24, 2010, 61/392,486, filed on Oct. 13, 2010, 61/387,011, filed on Sep. 28, 2010, 61/376,996, filed on Aug. 25, 2010, 61/376,164, filed on Aug. 23, 2010, and 61/375,288, filed on Aug. 20, 2010, the contents of which are all hereby incorporated by reference herein in their entirety.

BACKGROUND OF THE INVENTION

1. Field of the Invention

The present invention relates to a wireless communication system. And, more particularly, the present invention relates to a method for transmitting control information in wireless communication system and apparatus therefor.

2. Discussion of the Related Art

In a mobile communication system, a user equipment may receive information from a base station via downlink, and the user equipment may also transmit information via uplink. The information received or transmitted by the user equipment includes data and diverse control information. And, various physical channels may exist depending upon the type and purpose of the information received or transmitted by the user equipment.

FIG. 1 illustrates physical channels that are used in a $3^{rd}$ Generation Partnership Project (3GPP) Long Term Evolution (LTE) system, which is an example of a mobile communication system and a general signal transmitting method using the same.

When a power of a user equipment is turned off and then turned back on, or when a user equipment newly enters (or accesses) a cell, the user equipment performs an initial cell search process, such as synchronizing itself with the base station in step S101. For this, the user equipment may receive a P-SCH (Primary Synchronization Channel) and an S-SCH (Secondary Synchronization Channel) from the base station so as to be in synchronization with the base station, and the user equipment may also acquire information, such as cell ID. Thereafter, the user equipment may receive a Physical Broadcast Channel so as to acquire broadcast information within the cell. Meanwhile, the user equipment may receive Downlink Reference Signal (DL RS), in the step of initial cell search, so as to verify the downlink channel status.

The user equipment that has completed the initial cell search may receive a Physical Downlink Control Channel (PDCCH) and a Physical Downlink Shared Channel (PDSCH) based upon the Physical Downlink Control Channel (PDCCH) information, in step S102, so as to acquire more detailed system information.

Meanwhile, the user equipment that has not yet completed the initial cell search may perform a Random Access Procedure, such as in steps S103 and S106 of a later process, so as to complete the access to the base station. In order to do so, the user equipment transmits a characteristic sequence through a Physical Random Access Channel (PRACH) as a preamble (S103), and then the user equipment may receive a response message respective to the random access through the PDCCH and its respective PDSCH (S104). In case of a contention based random access, excluding the case of a handover, the user equipment may perform Contention Resolution Procedures, such as transmitting an additional Physical Random Access Channel (PRACH) (S105) and receiving a Physical Downlink Control Channel (PDCCH) and a Physical Downlink Shared Channel (PDSCH) corresponding to the PDCCH.

After performing the above-described procedures, the user equipment may receive a Physical Downlink Control Channel (PDCCH)/Physical Downlink Shared Channel (PDSCH) (S107), as a general uplink/downlink signal transmission procedure, and may then perform Physical Uplink Shared Channel (PUSCH)/Physical Uplink Control Channel (PUCCH) transmission (S108).

FIG. 2 illustrates a signal processing procedure performed by the user equipment for transmitting uplink signals.

In order to transmit an uplink signal, a scrambling module 210 of the user equipment may scramble a transmission signal by using a user equipment specific scrambling signal. Then, the scrambled signal is inputted to a modulation mapper 220 so as to be modulated to a complex symbol by using a Binary Phase Shift Keying (BPSK) scheme, a Quadrature Phase Shift Keying (QPSK) scheme, or a 16 Quadrature Amplitude Modulation (16QAM) scheme, based upon a type of the transmission signal and/or a channel status. Afterwards, the modulated complex symbol is processed by a conversion precoder 230 and then inputted to a resource element mapper 240. Herein, the resource element mapper 240 may map the complex symbol to a time-frequency resource element, which is to be used in the actual transmission. The processed signal may then pass through an SC-FDMA signal generator 250 so as to be transmitted to the base station through an antenna.

FIG. 3 illustrates a signal processing procedure performed by the base station for transmitting downlink signals.

In a 3GPP LTE system, a base station may transmit one or more code words. Accordingly, each of the one or more code words may be processed as a complex symbol by a scrambling module 301 and a modulation mapper 302, just as described in the uplink of FIG. 2. Subsequently, each of the complex symbols may be mapped to a plurality of layers by a layer mapper 303, and each layer may be multiplied by a predetermined precoding matrix, which is selected based upon the channel status, by a precoding module 304, thereby being allocated to each transmission antenna. Each of the processed transmission signals respective to an antenna is mapped to a time-frequency resource element, which is to be used in the actual transmission, by a respective resource element mapper 305. Thereafter, each of the transmission processed signals passes through an Orthogonal Frequency Division Multiple Access (OFDM) signal generator 306 so as to be transmitted through each antenna.

In a mobile communication system, when the user equipment transmits a signal via uplink, a Peak-to-Average Ratio (PAPR) may be more disadvantageous then when the base station performs transmission via downlink. Therefore, as described above in association to FIG. 2 and FIG. 3, unlike the OFDMA scheme, which is used in downlink signal transmission, the Single Carrier-Frequency Division Multiple Access (SC-FDMA) scheme is used in uplink signal transmissions.

FIG. 4 illustrates an SC-FDMA scheme for transmitting uplink signals and an OFDMA scheme for transmitting downlink signals in a mobile communication system.

Herein, a user equipment for uplink signal transmission and a base station for downlink signal transmission are identical to one another in that each of the user equipment and the base station includes a Serial-to-Parallel Converter 401, a subcarrier mapper 403, an M-point IDFT module 404, and a Cyclic Prefix (CP) adding module 406.

However, the user equipment for transmitting signals by using the SC-FDMA scheme additionally includes a Parallel-to-Serial Converter 405 and an N-point IDFT module 402. And, herein, the N-point IDFT module 402 is configured to cancel a predetermined portion of an IDFT processing influence caused by the M-point IDFT module, so that the transmission signal can have a single carrier property. FIG. 5 illustrates a frequency-domain signal mapping method for satisfying a single carrier characteristic within the frequency domain. In FIG. 5, (a) represents a localized mapping method, and (b) represents a distributed mapping method. The localized mapping method is defined in the current 3GPP LTE system.

Meanwhile, description will now be made on a clustered SC-FDMA, which corresponds to a corrected form of the SC-FDMA. In sequentially performing a subcarrier mapping process between the DFT process and the IFFT process, the clustered SC-FDMA divides DFT process output samples into sub-groups, so that an IFFT sample input unit can map each sub-group to subcarrier regions, which are spaced apart from one another. And, in some cases, clustered SC-FDMA may include a filtering process and a cyclic extension process.

At this point, a sub-group may be referred to as a cluster, and cyclic extension refers to a process of inserting a guard interval, which is longer than a maximum delay spread of a channel, between consecutive (or contiguous) symbols in order to prevent inter-symbol interference (ISI) while each subcarrier symbol is being transmitted through a multi-path channel.

SUMMARY OF THE INVENTION

Accordingly, the present invention is directed to a method for transmitting control information in a wireless communication system in a wireless communication system and an apparatus therefor that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the present invention, as embodied and broadly described, in a method for transmitting information data by using a Reed-Muller (RM) coding scheme in a wireless communication system, a method for transmitting information data includes the steps of dividing the information data to first information data and second information data if a bit size O of the information data is equal to or larger than a predetermined number; applying RM coding on each of the first information data and the second information data; and concatenating the coded first information data and the coded second information data, and transmitting the concatenated data.

Preferably, the step of applying RM coding may include configuring a number Q' of resource elements for transmitting the information data based upon a bit size O of the information data; allocating the calculated number Q' of resource elements equally to a first number $Q_1'$ of resource elements for the first information data and to a second number $Q_2'$ of resource elements for the second information data; and performing rate matching so that the first number $Q_1'$ of resource elements can correspond to the coded first information data, and performing rate matching so that the second number $Q_2'$ of resource elements can correspond to the coded second information data. And, the step of transmitting the combined data may include transmitting the concatenated first information data and second information data by using the predetermined number Q' of resource elements.

In another aspect of the present invention, in a transmitting apparatus of a wireless communication system, the transmitting apparatus includes a processor configured to divide information data to first information data and second information data if a bit size O of the information data is equal to or larger than a predetermined number, to apply RM coding on each of the first information data and the second information data, and to concatenate the coded first information data and the coded second information data; and a transmission module configured to transmit the concatenated coded first information data and coded second information data.

Additionally, the processor may configure a number Q' of resource elements for transmitting the information data based upon a bit size O of the information data, may allocate the calculated number Q' of resource elements equally to a first number $Q_1'$ of resource elements for the first information data and to a second number $Q_2'$ of resource elements for the second information data, and may perform rate matching so that the first number $Q_1'$ of resource elements can correspond to the coded first information data, and may perform rate matching so that the second number $Q_2'$ of resource elements can correspond to the coded second information data. Also, the transmission module may transmit the concatenated first information data and second information data by using the predetermined number Q' of resource elements.

Herein, the predetermined number may correspond to 12 bits, and each bit size of the coded first information data and the coded second information data may correspond to 32 bits. Also, the information data may correspond to UCI (Uplink Control Information), and the Uplink Control Information may be transmitted through an uplink shared channel. And, preferably, the Uplink Control Information may include HARQ (Hybrid Automatic Retransmission reQuest)-ACK/NACK (Acknowledgment/Negative Acknowledgment) data or an RI (Rank Indicator).

More specifically, it is preferable that a size $O_1$ of the first information data corresponds to $$\left[\frac{O}{2}\right]$$

bits, that a size $O_2$ of the second information data corresponds to $$O - \left\lceil \frac{O}{2} \right\rceil = \left\lfloor \frac{O}{2} \right\rfloor$$

bits. Furthermore, when the number Q' of resource elements is an even number, each of the first number $Q_1$' of resource elements and the second number $Q_2$' of resource elements may correspond to $$\frac{Q'}{2}.$$

And, when the number Q' of resource elements is an odd number, the first number $Q_1$' of resource elements may correspond to (Q'+1)/2 and the second number $Q_2$' of resource elements may correspond to (Q'−1)/2.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. The detailed description of the present invention is provided to facilitate the understanding of the configuration, operation, and other characteristics of the present invention provide a description of an exemplary embodiment of the present invention. The following embodiments of the present invention correspond to an exemplary system having the technical features of the present invention applied therein. The description of the present invention will be made by using an IEEE 802.16 system as the example of the present invention, for simplicity. However, this is merely exemplary, and, therefore, the present invention may be applied to diverse wireless communication systems included in a $3^{rd}$ Generation Partnership Project (3GPP) system.

The specific terms used in the following description of the present invention are provided to facilitate the understanding of the present invention. And, therefore, without deviating from the technical scope and spirit of the present invention, the usage of such specific terms may also be varied to different forms.

Figure 1:
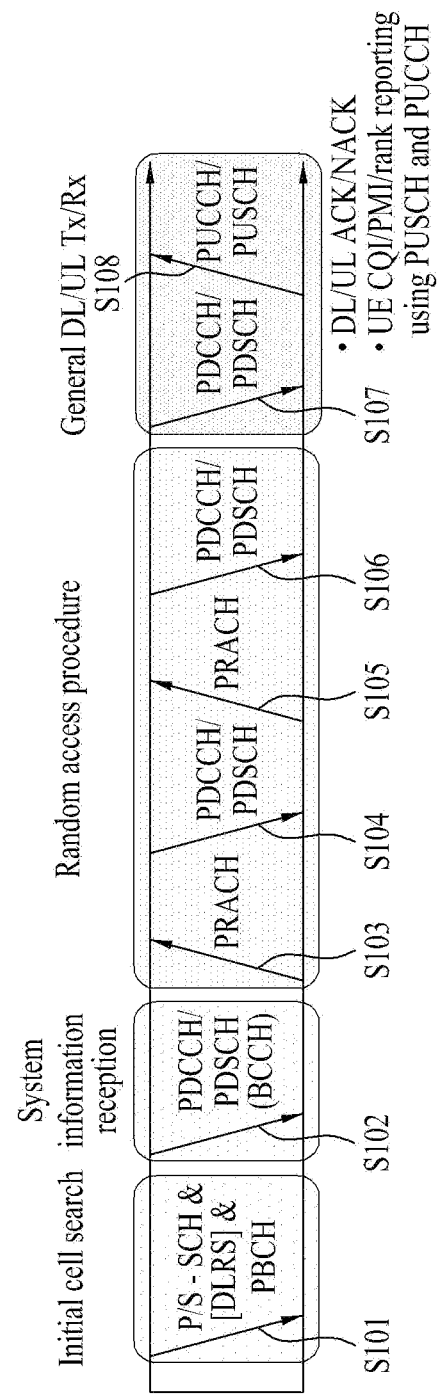
FIG. 1 illustrates physical channels that are used in a $3^{rd}$ Generation Partnership Project (3GPP) Long Term Evolution (LTE) system, which is an example of a mobile communication system and a general signal transmitting method using the same.
Figure 2:
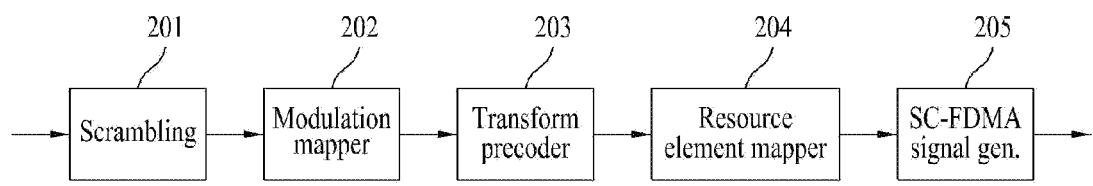
FIG. 2 illustrates a signal processing procedure performed by the user equipment for transmitting uplink signals.
Figure 3:
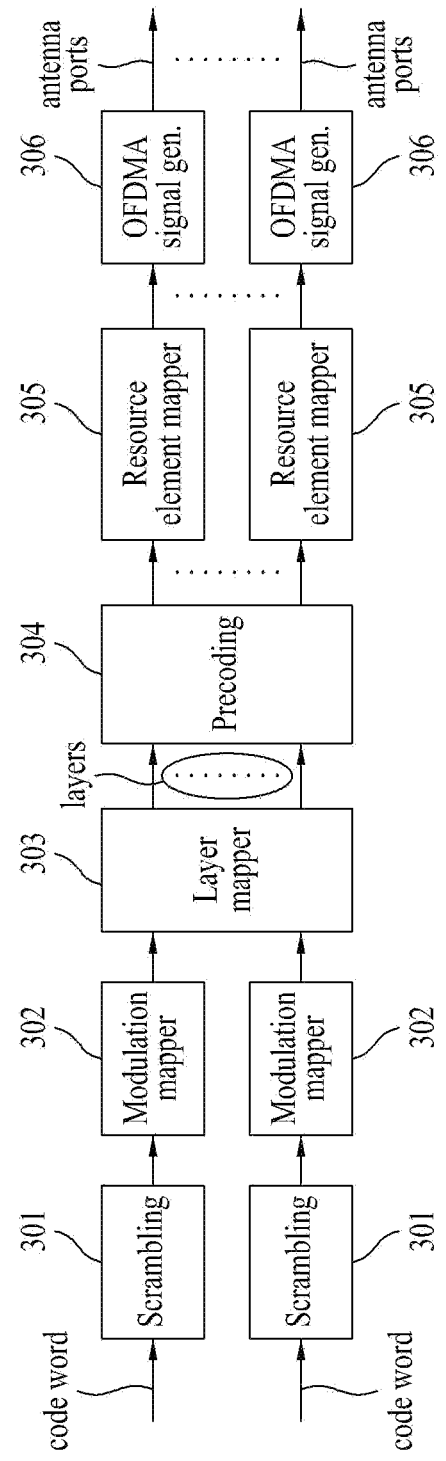
FIG. 3 illustrates a signal processing procedure performed by the base station for transmitting downlink signals.
Figure 4:
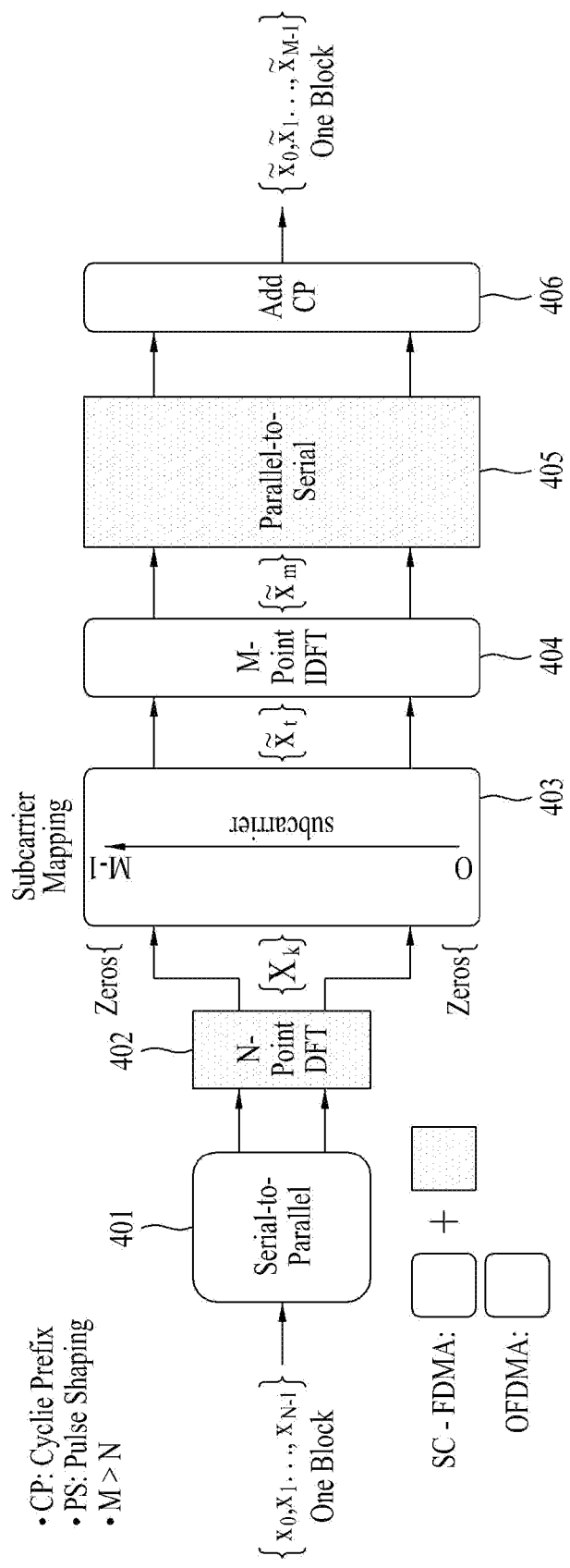
FIG. 4 illustrates an SC-FDMA scheme for transmitting uplink signals and an OFDMA scheme for transmitting downlink signals in a mobile communication system.
Figure 5:
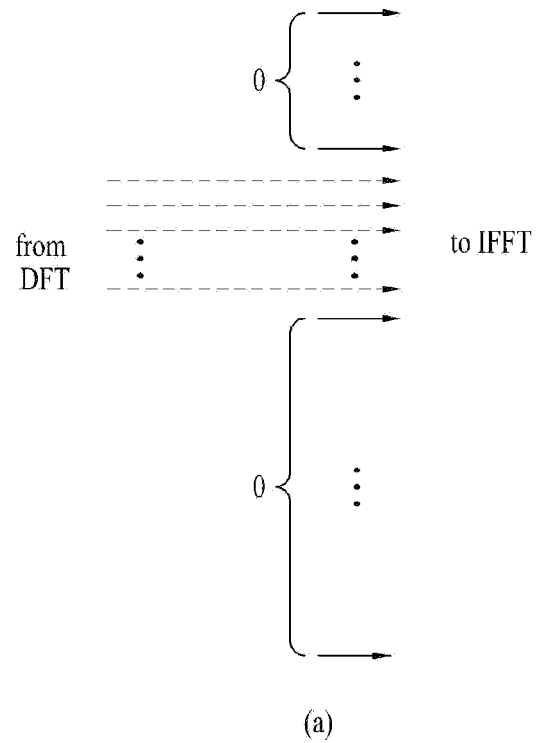
FIG. 5 illustrates a frequency-domain signal mapping method for satisfying a single carrier characteristic within the frequency domain.
Figure 5:
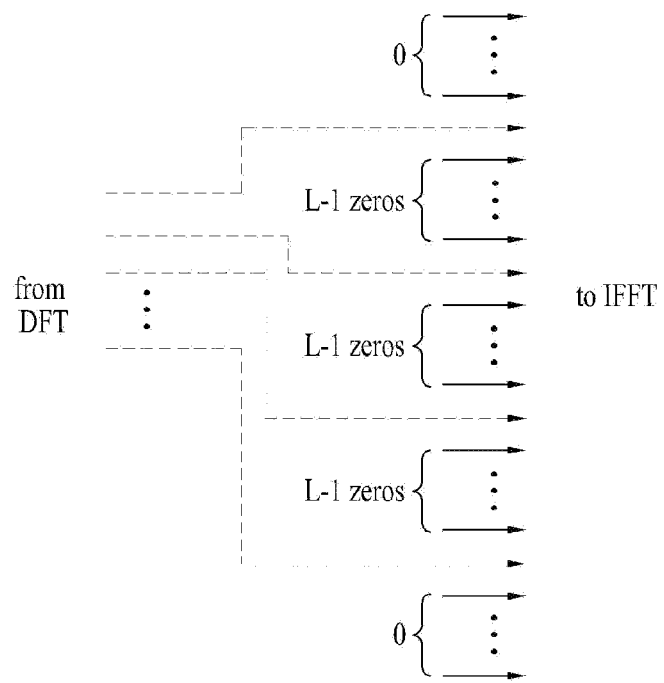
Figure 6:
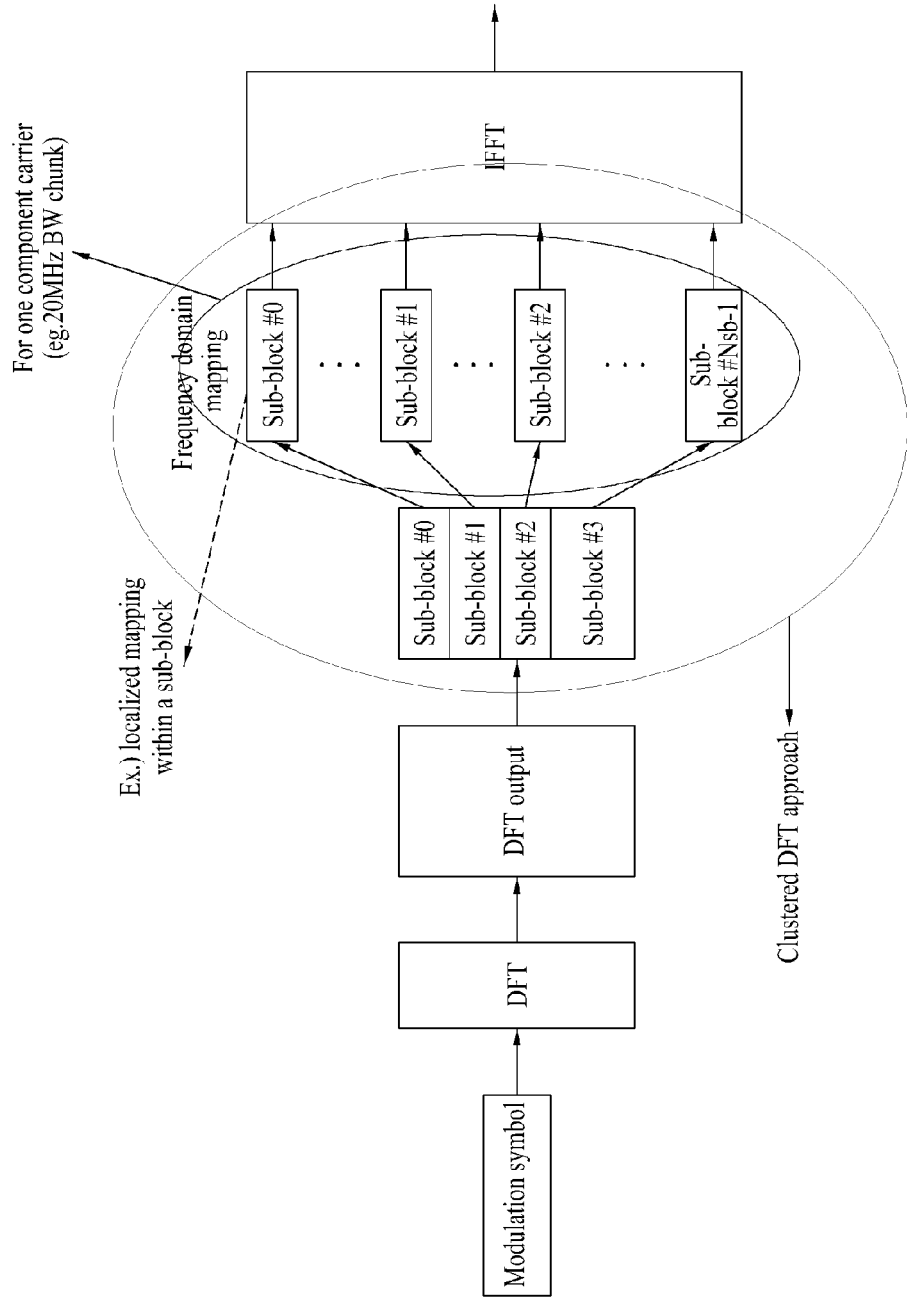
FIG. 6 illustrates a signal processing procedure, wherein DFT process output samples are mapped to a single carrier, in a cluster SC-FDMA according to an embodiment of the present invention.

FIG. 6 illustrates a signal processing procedure, wherein DFT process output samples are mapped to a single carrier, in a cluster SC-FDMA according to an embodiment of the present invention. Also, FIG. 7 and FIG. 8 respectively illustrate a signal processing procedure, wherein DFT process output samples are mapped to a multi-carrier, in a cluster SC-FDMA according to an embodiment of the present invention.

Figure 7:
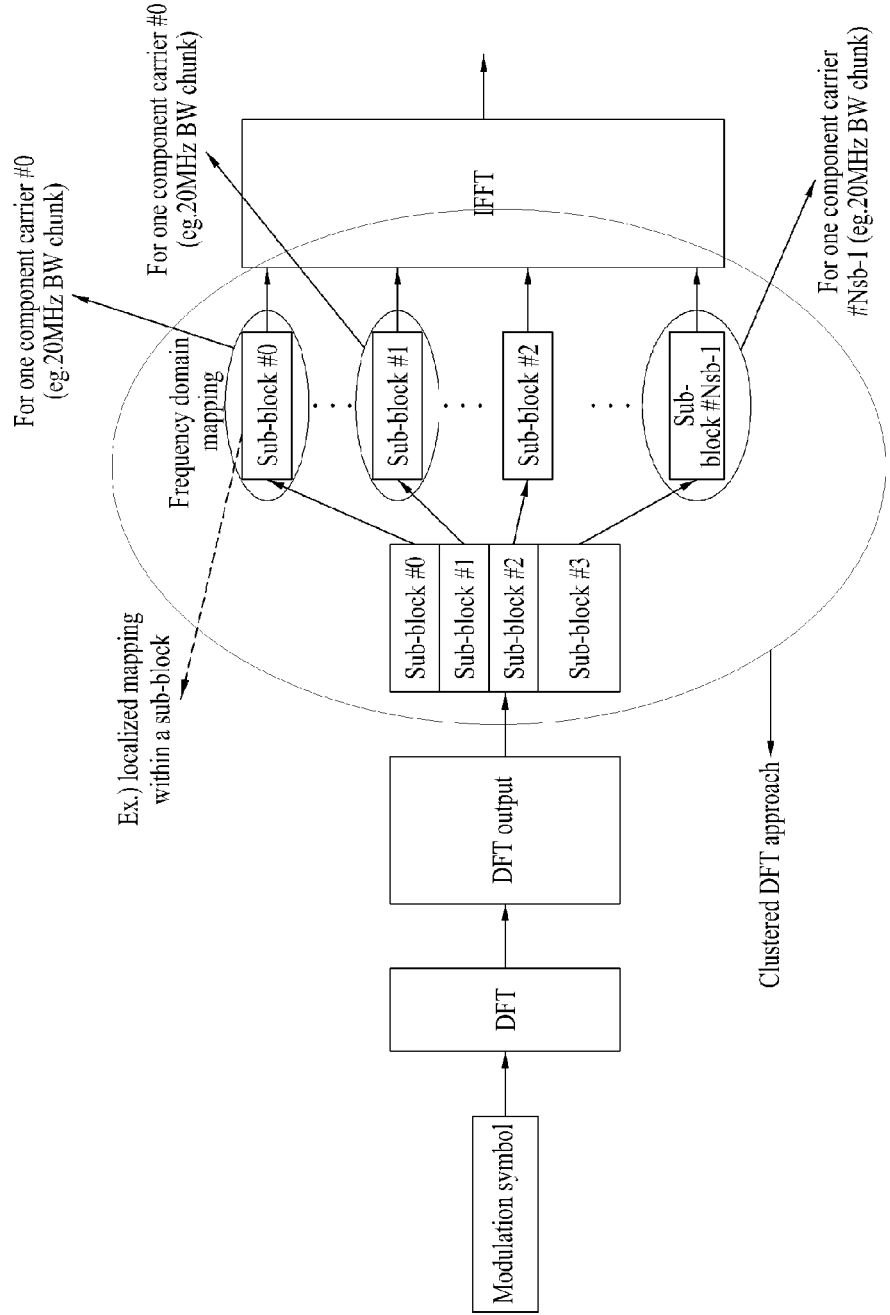
FIG. 7 and FIG. 8 respectively illustrate a signal processing procedure, wherein DFT process output samples are mapped to a multi-carrier, in a cluster SC-FDMA according to an embodiment of the present invention.
Figure 8:
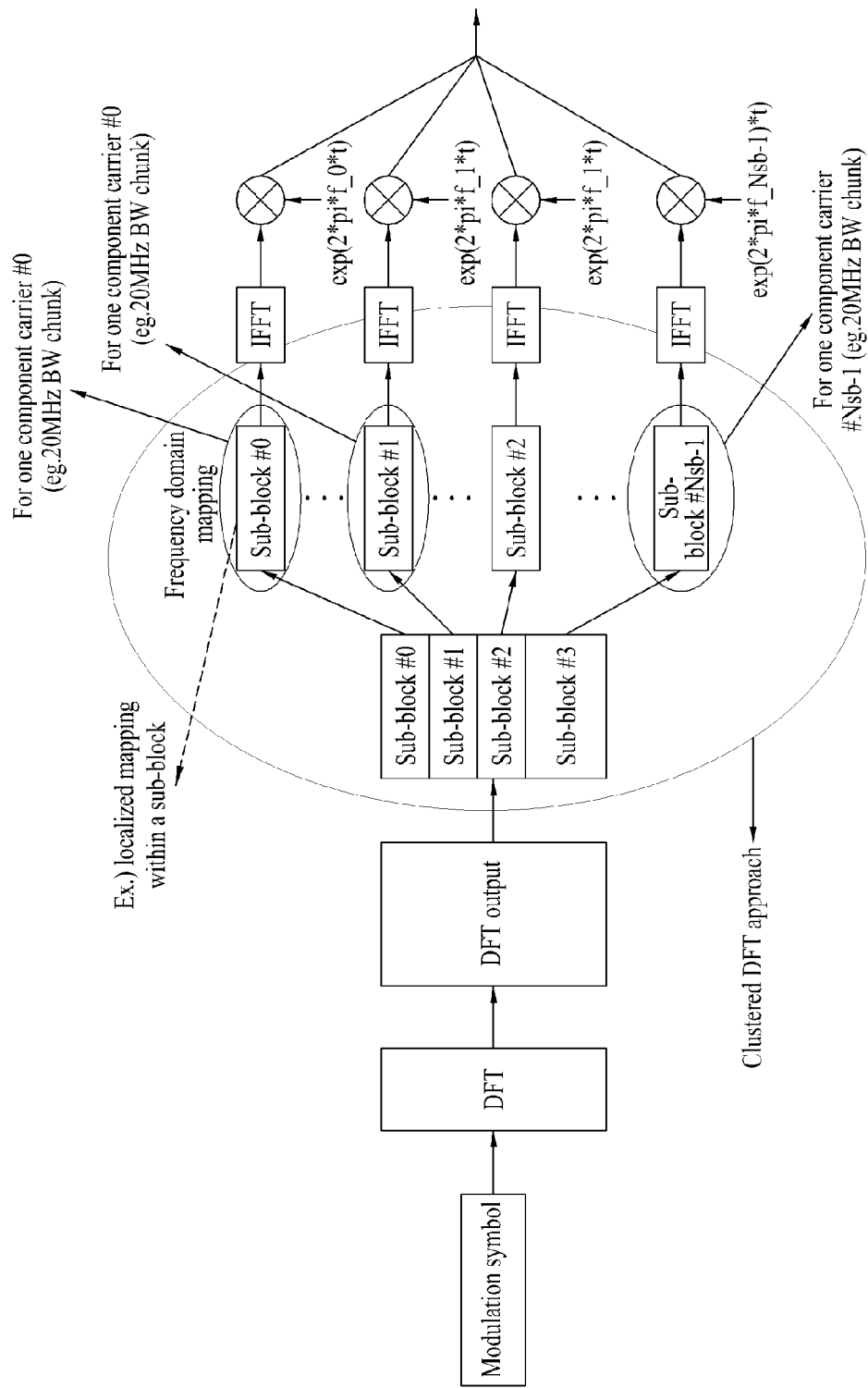

Herein, FIG. 6 corresponds to an example wherein cluster SC-FDMA is applied in an intra-carrier. And, FIG. 7 and FIG. 8 correspond to an example wherein cluster SC-FDMA is applied in an inter-carrier. Also, FIG. 7 represents a case where a signal is generated (or created) through a single IFFT block, when subcarrier spacing between neighboring component carriers is aligned, while contiguous component carriers are allocated in a frequency domain. And, FIG. 8 represents a case where a signal is generated through multiple IFFT blocks, since component carriers are not adjacent to one another, while component carriers are non-contiguously allocated in the frequency domain.

Segmented SC-FDMA refers to simply performing DFT spreading of the conventional SC-FDMA and extending a frequency subcarrier mapping configuration of the IFFT in accordance with a relation between the DFT and the IFFT having a one-to-one correspondence, when a number of IFFTs equal to a random number of DFTs is being applied. Herein, the segmented SC-FDMA may also be referred to as NxSC-FDMA or NxDFT-s-OFDMA. In the description of the present invention, this will be collectively referred to as segmented SC-FDMA.

Figure 9:
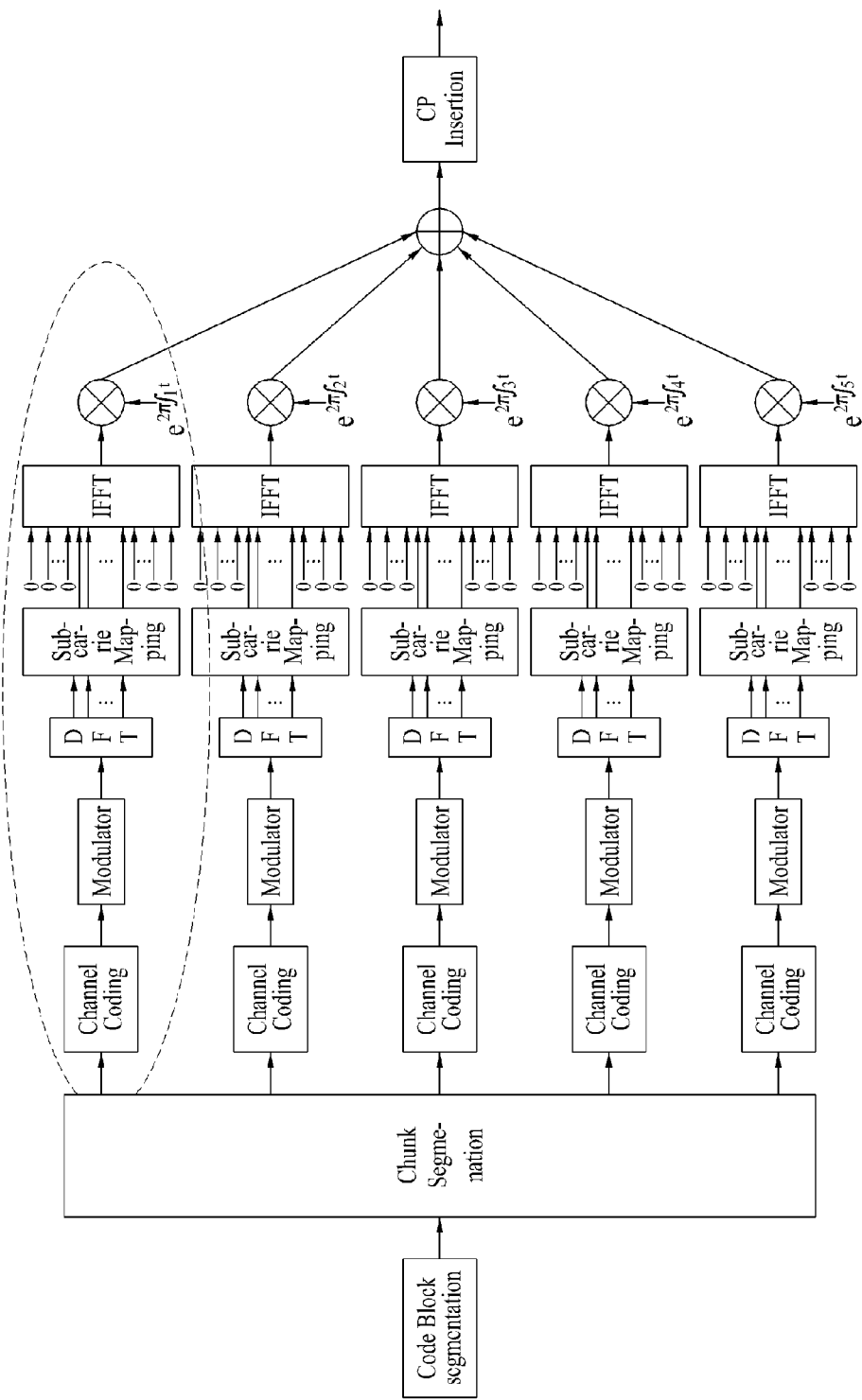
FIG. 9 illustrates a signal processing procedure in a segment SC-FDMA system according to an embodiment of the present invention.

FIG. 9 illustrates a signal processing procedure in a segmented SC-FDMA system according to an embodiment of the present invention. As shown in FIG. 9, the segmented SC-FDMA process refers to a process of grouping the entire time domain modulation symbols to N number of groups (wherein N is an integer greater than 1) and performing a DFT process in group units, in order to alleviate the single carrier property condition (or specification).

Figure 10:
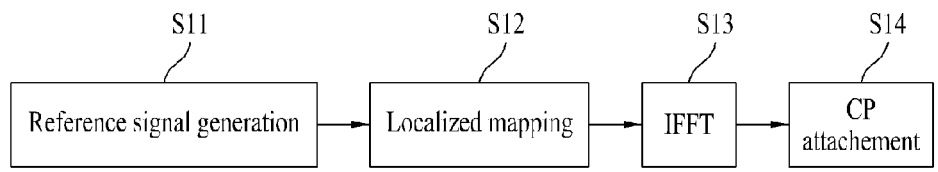
FIG. 10 illustrates a signal processing procedure for transmitting a reference signal (hereinafter referred to as RS) via uplink.

FIG. 10 illustrates a signal processing procedure for transmitting a reference signal (hereinafter referred to as RS) via uplink. As shown in FIG. 10, data generate a signal from the time domain and processed with frequency mapping through a DFT precoder, so as to be transmitted through the IFFT. Conversely, an RS bypasses the DFT precoder and is directly generated in the frequency domain (S11) and is transmitted after being sequentially processed with localized mapping (S12) and IFFT (S13) processes and then processed with a cyclic prefix (CP) adding process (S14).

Figure 11:
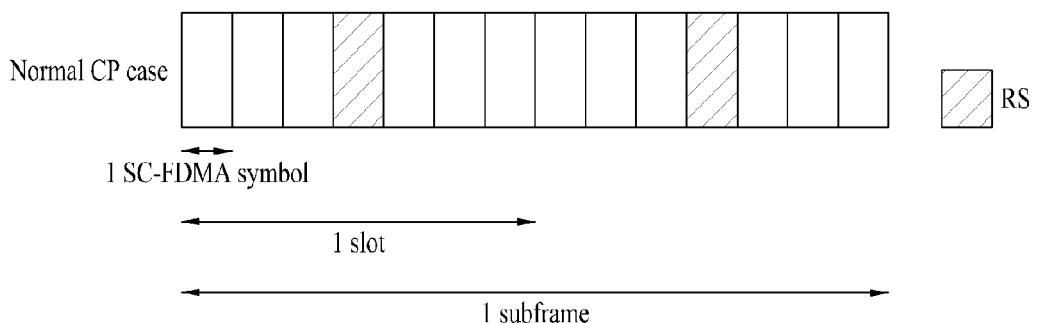
FIG. 11 illustrates a subframe structure for transmitting an RS in case of a normal cyclic prefix (CP)
Figure 12:
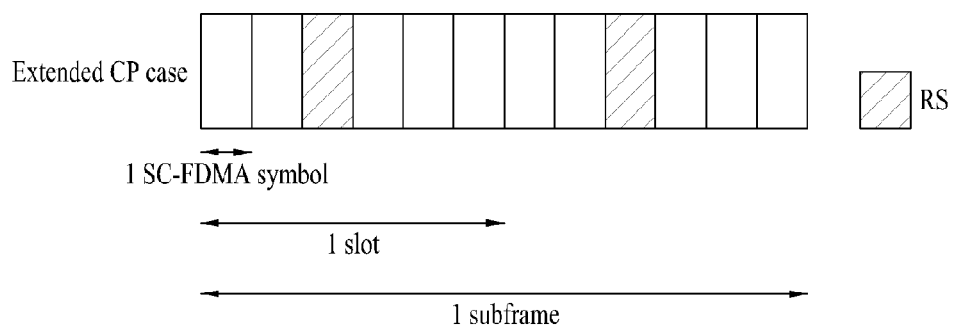
FIG. 12 illustrates a subframe structure for transmitting an RS in case of an extended cyclic prefix (CP)

FIG. 11 illustrates a subframe structure for transmitting an RS in case of a normal cyclic prefix (CP). And, FIG. 12 illustrates a subframe structure for transmitting an RS in case of an extended cyclic prefix (CP). Referring to FIG. 11, the RS is transmitted through $4^{th}$ and $11^{th}$ OFDM symbols. And, referring to FIG. 12, the RS is transmitted through $3^{rd}$ and $9^{th}$ OFDM symbols.

Figure 13:
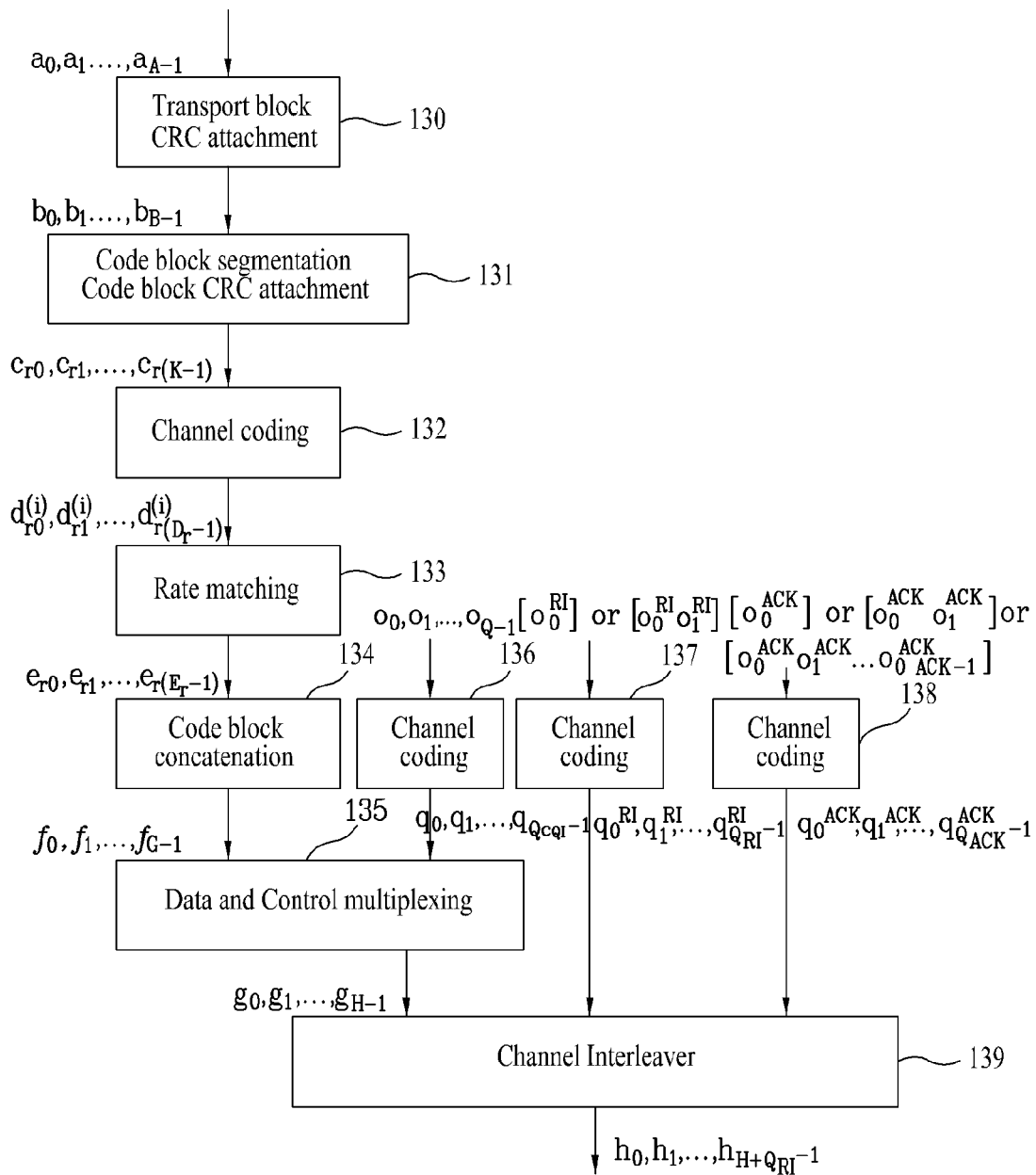
FIG. 13 illustrates a block view showing a processing procedure of a transmission channel with respect to an uplink shared channel.

Meanwhile, a processing structure of an uplink shared channel as a transmission channel will now be described as follows. FIG. 13 illustrates a block view showing a processing procedure of a transmission channel with respect to an uplink shared channel. As shown in FIG. 13, data information that is multiplexed with control information adds a TB-specific CRC (Cyclic Redundancy Check) to a Transport Block (hereinafter referred to as "TB"), which is to be transmitted via uplink (130). Then, depending upon a TB size, the processed transport block is divided into a plurality of Code blocks (hereinafter referred to as "CB"s), and CB-specific CRC is added to the plurality of CBs (131). Thereafter, channel coding is performed on the resulting value (132). Subsequently, the channel-coded data are processed with rate matching (133), and, then, a combination of the CBs is performed once again (134). Afterwards, the combined CBs are multiplexed with a CQI/PMI (Channel Quality Information/Precoding Matrix Index) (135).

Meanwhile, a channel coding process separate from that of the data is performed on the CQI/PMI (136). Then, the channel-coded CQI/PMI is multiplexed with the data (135).

Furthermore, a channel coding process separate from that of the data is also performed on an RI (Rank Indication).

In case of an Acknowledgment/Negative Acknowledgment (ACK/NACK), a channel coding process separate from the channel coding processes of the data, the CQI/PMI, and the RI is performed (138). The multiplexed data and the CQI/PMI, the separately channel-coded RI, and the ACK/NACK are processed with channel interleaving, thereby generating an output signal (139).

Meanwhile, a detailed description will be made on physical resource elements (hereinafter referred to as "RE"s) for data and control information, in an LTE uplink system.

Figure 14:
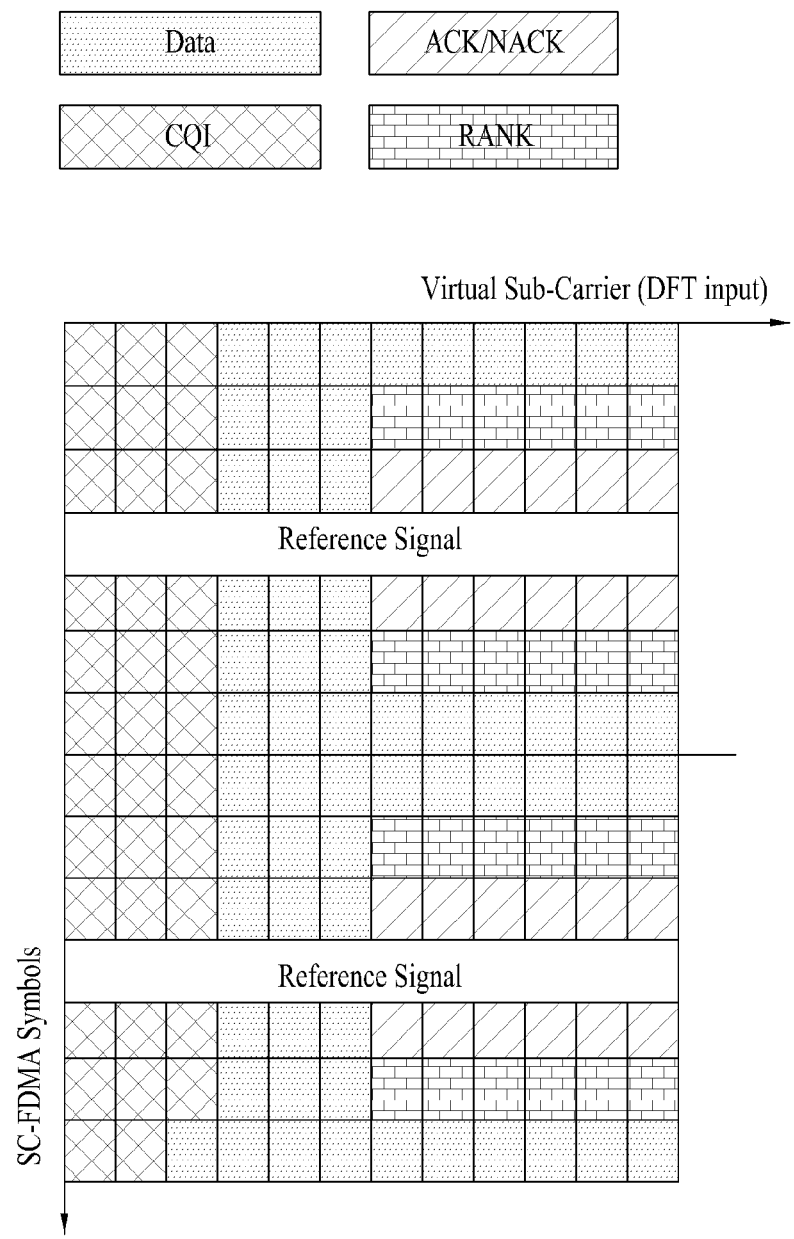
FIG. 14 illustrates a mapping method of a physical resource for uplink data and control channels.

FIG. 14 illustrates a mapping method of a physical resource for uplink data and control channels.

As shown in FIG. 14, the CQI/PMI and the data are mapped on an RE in a time-first method. The coded ACK/NACK are punctured and inserted in the surroundings of a demodulation reference signal (DM RS), and the RI is mapped to an RE positioned next to the RE having the ACK/NACK inserted therein. Resources for the RI and the ACK/NACK may occupy a maximum of 4 SC-FDMA symbols. In case data and control information are simultaneously transmitted to an uplink shared channel, the mapping order may correspond to an order of the RI, a concatenation of the CQI/PMI and the data, and the ACK/NACK. More specifically, the RI is first mapped, and then the concatenation of the CQI/PMI and the data are mapped to the remaining REs, excluding the RE having the RI mapped thereto, by using the time-first method. The ACK/NACK is mapped by puncturing the concatenation of the CQI/PMI and the data, which are already mapped to the respective REs.

As described above, by multiplexing the data and uplink control information (UCI), such as the CQI/PMI and so on, the single carrier property may be satisfied. Therefore, an uplink transmission maintaining a low Cubic Metric (CM) may be achieved.

In an enhanced system of the conventional system (e.g., LTE Rel-10), with respect to each user equipment, among the two transmission methods of the SC-FDMA and the cluster DFTs OFDMA within each carrier component, at least one transmission method may be applied for uplink transmission. And, the applied transmission method may be applied along with an Uplink-MIMO (UL-MIMO) transmission.

Figure 15:
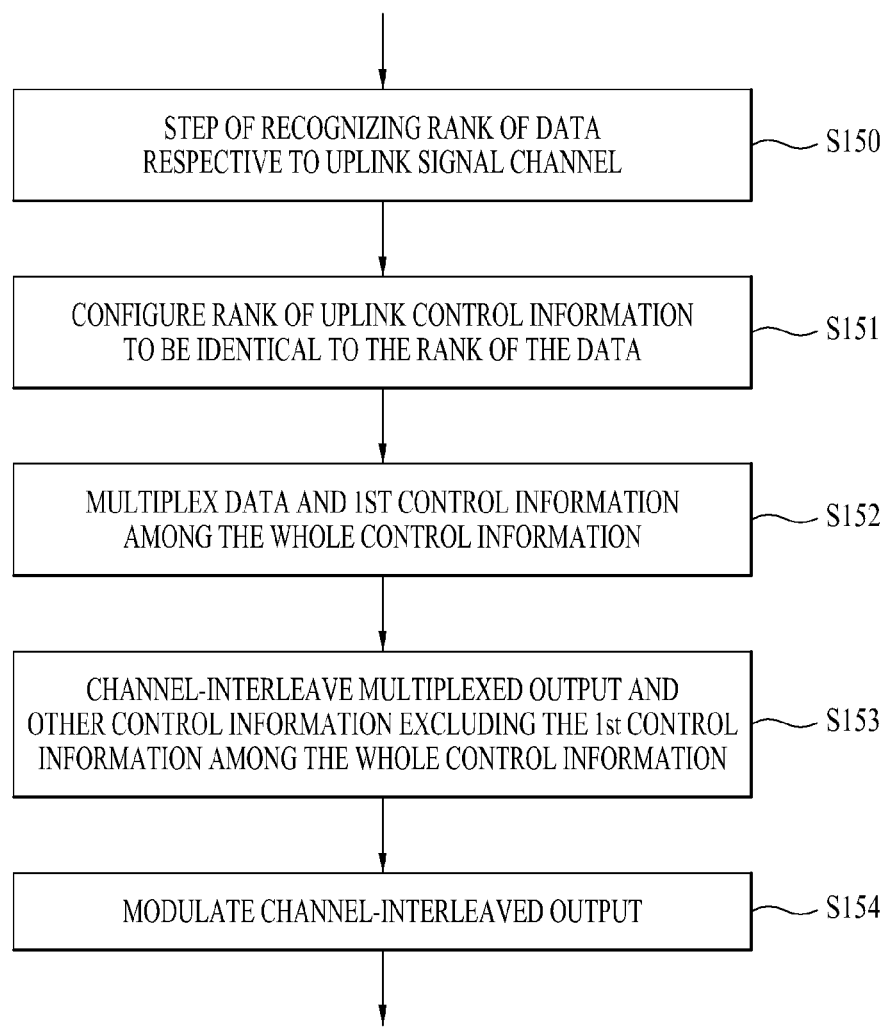
FIG. 15 illustrates a flow chart showing a method for efficiently multiplexing data and control channels within an uplink shared channel.

FIG. 15 illustrates a flow chart showing a method for efficiently multiplexing data and control channels within an uplink shared channel.

As shown in FIG. 15, the user equipment recognizes a rank of data respective to a Physical Uplink Shared Channel (PUSCH) (S150). Then, the user equipment configures a rank of an uplink control channel (herein, a control channel refers to Uplink Control Information (UCI), such as CQI, ACK/NACK, RI, and so on) to be identical to the rank of the data (S151). Also, the user equipment multiplexes data and control information (S152). Subsequently, after mapping the data and the CQI by using a time-first method, channel interleaving may be performed so as to map the RI to a designated RE and to map the ACK/NACK by puncturing the REs surrounding the DM-RS (S153).

Thereafter, the data and the control channel may be modulated to QPSK, 16QAM, 64QAM, and so on in accordance with an MCS table (S154). At this point, the modulation step may be moved (or shifted) to another position. (For example, the modulation block may be moved (or shifted) to a position prior to the multiplexing step of the data and the control channel.) Furthermore, channel interleaving may either be performed in code word units or be performed in layer units.

Figure 16:
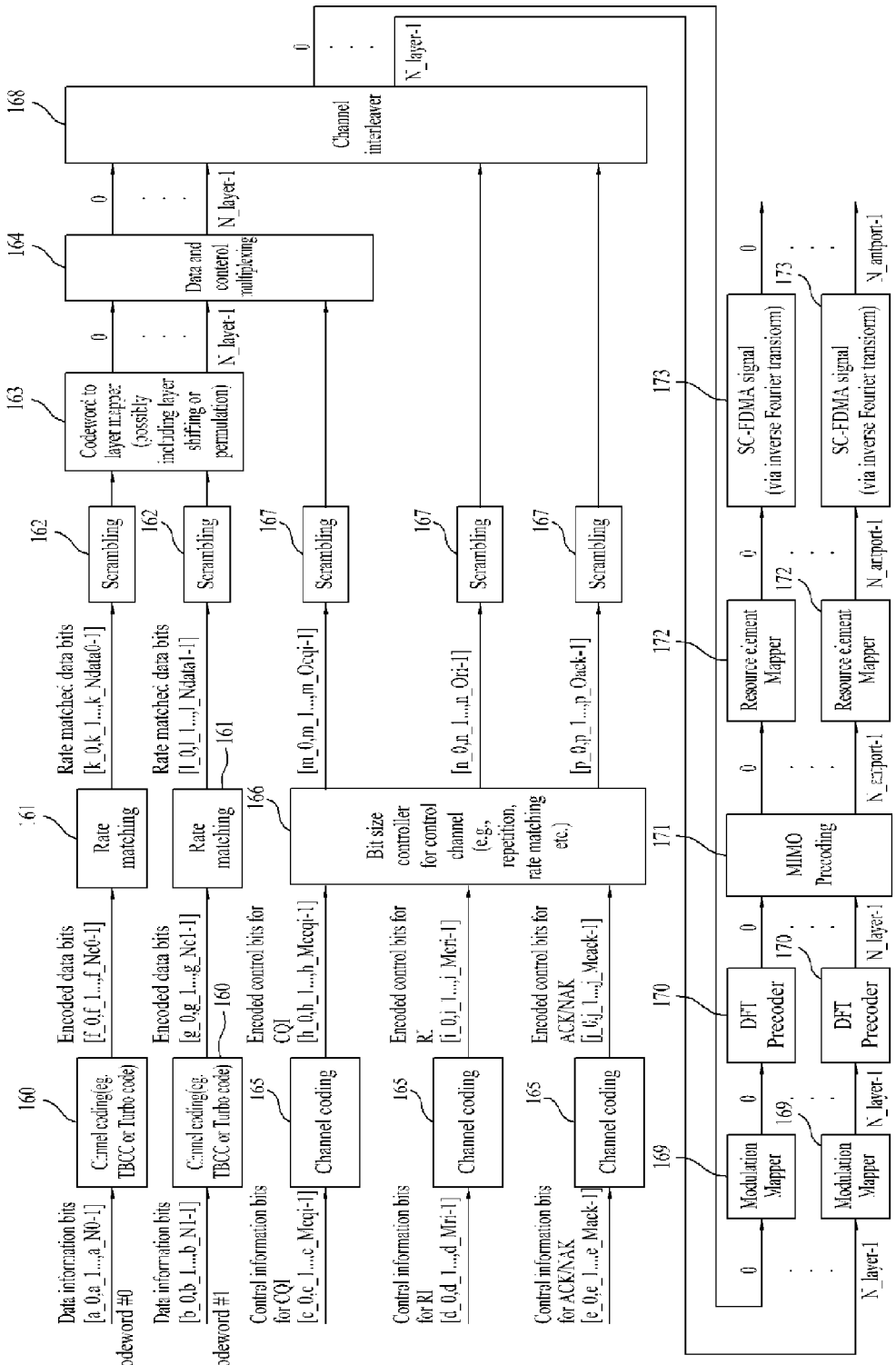
FIG. 16 illustrates a block view showing a method of generating transmission signals of data and control channels.

FIG. 16 illustrates a block view showing a method of generating transmission signals of data and control channels.

Assuming that there are two code words, channel coding is performed on each code word (160), and rate matching is performed based upon a given MCS level and resource size (161). Thereafter, coded bits may be scrambled by using a cell-specific method, a UE-specific method or a codeword-specific method (162).

Subsequently, a codeword to layer mapping is performed (163). During this process, operations of a layer shift or permutation may be included.

Figure 17:
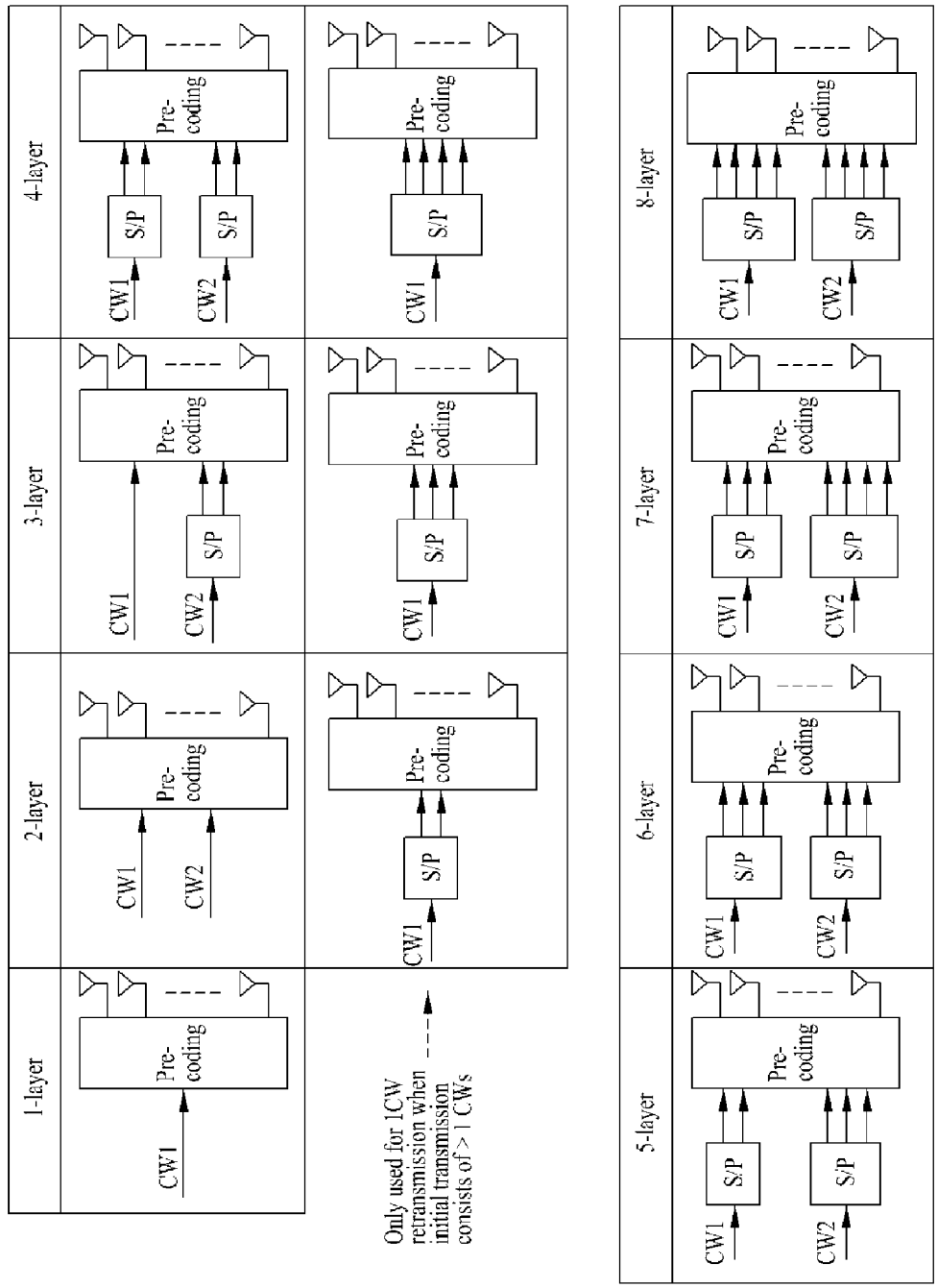
FIG. 17 illustrates a codeword to layer mapping method.

FIG. 17 illustrates a codeword to layer mapping method. The codeword to layer mapping may be performed by using the rule shown in FIG. 17. The precoding position shown in FIG. 17 may be different from the precoding position shown in FIG. 13.

Control information, such as CQI, RI, and ACK/NACK, is channel coded based upon a given specification (165). At this point, the CQI, the RI, and the ACK/NACK may be coded by using the same channel code for all codewords or may be coded by using different channel codes for each codeword.

Thereafter, a number of coded bits may be varied by a bit-size controller (166). The bit-size controller may form a single body with the channel coding block (165). A signal outputted from the bit-size controller is scrambled (167). At this point, scrambling may be performed to be cell-specific, layer-specific, codeword-specific, or UE-specific.

The bit-size controller may perform the following operations.

(1) The controller recognizes a rank of data respective to PUSCH (n_rank_pusch).

(2) A rank of the control channel (n_rank_control) is configured to be identical as the rank of the data (i.e., n_rank_control=n_rank_pusch), and a number of bits respective to the control channel is multiplied by the control channel rank, thereby extending the number of bits.

One of the methods of performing the above-described operation is to simply duplicate and repeat the control channel. At this point, the control channel may either correspond to an information level prior to being processed with channel coding or correspond to a coded bit level after being processed with channel coding. More specifically, for example, in case of a control channel [a0, a1, a2, a3] having n_bit_crtl=4, and when n_rank_pusch=2, a number of extended bits (n_ext_crtl) may become 8 bits [a0, a1, a2, a3, a0, a1, a2, a3].

In case the bit-size controller and the channel coding unit are configured as a single body, the coded bits may be generated by adopting channel coding and rate matching, which are defined in the conventional system (e.g., LTE Rel-8).

Additionally, in order to further provide randomization for each layer, a bit level interleaving process may be performed in the bit-size controller. Alternatively, as an equivalent of the above, an interleaving process may also be performed at a modulation symbol level.

A CQI/PMI channel and data respective to 2 codewords may be multiplexed by a data/control multiplexer (164). Then, by having the ACK/NACK information be mapped to REs surrounding the uplink DM-RS, in each slot within a subframe, the channel interleaver maps the CQI/PMI in accordance with a time-first mapping method (168).

Then, modulation is performed for each layer (169), and DFT precoding (170), MIMO precoding (171), RE mapping (172), and so on, are sequentially performed. Thereafter, an SC-FDMA signal is generated and transmitted through an antenna port (173).

The function blocks are not limited to the positions shown in FIG. 16. And, in some cases, the corresponding positioned may be changed. For example, the scrambling blocks 162 and 167 may be positioned after the channel interleaving block. Also, the codeword to layer mapping block 163 may be positioned after the channel interleaving block 168 or after the modulation mapper block 169.

The present invention proposes a channel coding method of a UCI and a corresponding resource allocation and transmission method of the same respective to a case where the UCI, such as CQI, ACK/NACK, and RI, is being transmitted over the PUSCH. Although the description of the present invention is essentially based upon a transmission within an SU-MIMO environment, the present invention may also be applied to a single antenna transmission, which may correspond to a particular case of SU-MIMO.

In case the UCI and data currently corresponding to the SU-MIMO are transmitted over the PUSCH, transmission may be performed by using the following methods. Hereinafter, the position of the UCI within the PUSCH will now be described.

The CQI is concatenated to the data and is mapped to remaining REs, excluding the RE having the RI mapped thereto, by using the time-first mapping method and by using the same modulation order and constellation as the data. In case of the SU-MIMO, the CQI is transmitted by being dispersed to one codeword, and, among the two codewords, the codeword to which the CQI is transmitted corresponds to the codeword having a higher MCS level. And, in case the MCS levels of the two codewords are the same, the CQI is transmitted to codeword 0. Also, the ACK/NACK is positioned by puncturing a concatenation of the CQI and data, which are already mapped to symbols located at each side of a reference signal. And, since the reference signal is positioned in $3^{rd}$ and $10^{th}$ symbols, the mapping process is performed by starting from the lowermost subcarrier of $2^{nd}$, $4^{th}$, $9^{th}$, and $11^{th}$ symbols and proceeding upwards. At this point, the ACK/NACK symbol is mapped by an order the $2^{nd}$, $11^{th}$, $9^{th}$, $4^{th}$ symbols. The RI is mapped to a symbol positioned next to the ACK/NACK and is mapped earlier than any other information (data, CQI, ACK/NACK) being transmitted to the PUSCH. More specifically, mapping of the RI is performed by starting from the lowermost subcarrier of $1^{st}$, $5^{th}$, $8^{th}$, and $12^{th}$ symbols and proceeding upwards. At this point, the RI symbol is mapped by an order of the $1^{st}$, $12^{th}$, $8^{th}$, $5^{th}$ symbols. Most particularly, in case the information bit size is equal to 1 bit or 2 bits, the ACK/NACK and the RI are mapped by using only four corners of the constellation and by using the QPSK method. And, in case the information bit size is equal to or larger than 3 bits, the ACK/NACK and the RI may be mapped by using all constellations of the modulation order identical to that of the data. Furthermore, the ACK/NACK and the RI uses the same resources corresponding to the same position within each layer so as to transmit the same information.

Hereinafter, a method for calculating a number of resource elements for the UCI within the PUSCH will now be described. First of all, the number of resource elements for the CQI and the ACK/NACK (or RI), which are being transmitted within the PUSCH, may be respectively calculated by using Equation 1 and Equation 2 shown below.

$$Q' = \min\left(\left\lceil\frac{(O+L) \cdot M_{sc}^{PUSCH-initial} \cdot N_{symb}^{PUSCH-initial} \cdot \beta_{offset}^{PUSCH}}{\sum_{r=0}^{C^{(x)}-1} K_r^{(x)}}\right\rceil, M_{sc}^{PUSCH} \cdot N_{symb}^{PUSCH} - \frac{Q_{RI}}{Q_m}\right)$$  [Equation 1]

$$Q' =$$  [Equation 2]

$$\min\left(\left\lceil\frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}}\right\rceil, 4 \cdot M_{sc}^{PUSCH}\right)$$

Herein, the number of resource elements for the CQI and the ACK/NACK (or RI) may also be expressed as a number of coded modulation symbols.

Hereinafter, a channel coding method for a UCI being transmitted within the PUSCH will now be described. First of all, in case of the CQI, when a payload size is equal to or below 11 bits, an RM (Reed-Muller) coding process using Table 1 shown below is applied to an input sequence (i.e., information data) $o_0, o_1, o_2, \ldots, o_{O-1}$, so as to generate an output sequence of 32 bits. Also, in case a payload size of the CQI exceeds 11 bits, after adding an 8-bit CRC, a Tail biting convolutional coding (TBCC) method may be applied.

Meanwhile, a channel coding method for an ACK/NACK and an RI being transmitted within the PUSCH will now be described. If the information data size of the ACK/NACK and the RI is equal to 1 bit, i.e., if the input sequence is $[o_0^{UCI}]$, a channel coding process is performed in accordance with the modulation order as shown in Table 2 below. Also, if the information data size of the ACK/NACK and the RI is equal to 2 bits, i.e., if the input sequence is $[o_0^{UCI} o_1^{UCI}]$, a channel coding process is performed in accordance with the modulation order as shown in Table 3 below. Most particularly, referring to Table 3, $o_0^{UCI}$ corresponds to the ACK/NACK or RI data for codeword 0, and $o_1^{UCI}$ corresponds to the ACK/NACK or RI data for codeword 1, and $o_2^{UCI}$ corresponds to $(o_0^{UCI}+o_1^{UCI})\mod 2$. More specifically, in Table 2 and Table 3, x represents a value of 1, and y represents a repetition of a previous value.

Alternatively, when the information data size of the ACK/NACK and the RI is within a range of 3 bits to 11 bits, the RM (Reed-Muller) coding method using Table 1 shown below may be applied, thereby generating an output sequence of 32 bits.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 0 | 0 | 1 | 0 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

TABLE 2

| $Q_m$ | Encoded HARQ-ACK/RI |
|---|---|
| 2 | $[o_0^{UCI}\ y]$ |
| 4 | $[o_0^{UCI}\ y\ x\ x]$ |
| 6 | $[o_0^{UCI}\ y\ x\ x\ x\ x]$ |

TABLE 3

| $Q_m$ | Encoded HARQ-ACK/RI |
|---|---|
| 2 | $[o_0^{UCI}\ o_1^{UCI}\ o_2^{UCI}\ o_0^{UCI}\ o_1^{UCI}\ o_2^{UCI}]$ |
| 4 | $[o_0^{UCI}\ o_1^{UCI}\ x\ x\ o_2^{UCI}\ o_0^{UCI}\ o_1^{UCI}\ x\ x\ o_2^{UCI}\ x\ x]$ |
| 6 | $[o_0^{UCI}\ o_1^{UCI}\ x\ x\ x\ x\ o_2^{UCI}\ o_0^{UCI}\ o_1^{UCI}\ x\ x\ x\ x\ o_1^{UCI}\ o_2^{UCI}\ x\ x\ x\ x]$ |

Most particularly, in case of performing the RM (Reed-Muller) coding process using Table 1, output data $b_0, b_1, b_2, b_3, \ldots, b_{B-1}$ is expressed as shown in Equation 3 below, and B=32.

$$b_i = \sum_{n=0}^{O-1} (o_n \cdot M_{i,n}) \bmod 2 \quad \text{[Equation 3]}$$

Finally, the UCI coded to B bits, i.e., the ACK/NACK or RI data may perform rate matching in accordance with Equation 4 shown below, in order to be mapped to Q' number of resource elements, which is calculated according to Equation 1 and Equation 2.

$$q_i = b_{i \bmod B}, i=0,1,\ldots,Q_m \times Q'-1 \quad \text{[Equation 4]}$$

The related art channel coding method is realized under the assumption that a single carrier environment is given. However, in case a multiple carrier method is applied, as in the LTE-A system, since it is generally known that the UCI corresponding to each component carrier, i.e., the ACK/NACK or RI data are combined by a component carrier order, the UCI size may also increase in proportion to a number of aggregated component carriers. Most particularly, in case of the RI, the convention single carrier may have a maximum information data size of 3 bits. However, in an environment wherein 5 component carriers can be aggregated, the maximum information data size may be equal to 15 bits. Therefore, since a maximum of 11 bits of information data can be coded by using the currently realized RM coding scheme, a new scheme (or method) capable of decoding the UCI in a multiple carrier environment is required. Hereinafter, a coding method and a rate matching method for each UCI size will now be specifically proposed.

<First Embodiment—When the Information Data Size is Less than or Equal to 11 Bits>

In a single carrier environment and a multiple carrier environment, since RM coding is used, when the RI or ACK/NACK having the size of 3 bits or more, the coded output data has a bit size of 32 bits. However, in case the channel status is excellent, and when the number of resource elements is calculated by using Equation 1 and Equation 2, only an extremely small number of resource elements may be allocated based upon the bit size of the information data. In this case, during the rate matching step, which is performed by using Equation 4, the coded codewords may be excessively punctured due to the RM coding, thereby causing the performance to be degraded.

More specifically, in order to perform robust transmission regardless of the channel status, since the RI or ACK/NACK transmits codewords, which are coded by the RI or ACK/NACK by using the RM coding scheme, by using only the constellation points of corner points, instead of using all of the constellations so as perform modulation, it is generally known that only 2 bits are mapped to a single resource element. Therefore, in order to transmit all of the codewords coded to 32 bits, a total of 16 resource elements are required. And, at this point, if the calculated number of resource elements is smaller than 16, puncturing may be performed on the codewords as the rate matching process. However, when performing the puncturing process, a receiving end may determine the process as an error. Therefore, even if the codeword has a value of 16, which corresponds to the maximum value for the minimum distance between codes of the RM code, when puncturing a portion of the data corresponding 4 symbols, the performance cannot be ensured. Also, since the puncturing process is sequentially performed in 2-bit units starting from the very last bit of the codeword, in order to maintain the performance of the puncturing process, the degrading of the performance may be increased. Hereinafter, as a first embodiment of the present invention, the present invention proposes a method for preventing such degrading of the performance caused by the above-described puncturing process.

1) When the ACK/NACK or RI has an information data size corresponding to a specific number of bits, i.e., when the ACK/NACK or RI corresponds to information data having a size equal to or larger than 3 bits, the first embodiment of the present invention proposes a method of configuring a minimum value as the number of resource elements being allocated to the ACK/NACK or RI. For example, when the information data size of the ACK/NACK or RI is equal to or greater than 3 bits, the number of resource elements allocated for transmitting the information data of the ACK/NACK or RI is configured to be equal to a minimum number of 16 bits. Herein, it is preferable that the minimum value of the number of resource elements, which is allocated to the ACK/NACK or RI, is equal to or greater than half the number of bits corresponding to the information data size. More specifically, the number of REs being allocated to the ACK/NACK and the RI, i.e., the number of coded modulation symbols may be calculated by using Equation 6 and Equation 7 shown below.

$$Q'=\max(Q'_{min}, \min(Q'_{temp}, 4 \cdot M_{sc}^{PUSCH})) \quad \text{[Equation 5]}$$

$$Q'_{temp} = \left\lceil \frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_{offset}^{PUSCH}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}} \right\rceil \quad \text{[Equation 6]}$$

A minimum value $Q'_{min}$ for the number of resource elements being allocated to the ACK/NACK or RI may be decided according to Equation 7 shown below.

$$Q'_{min} = \left\lceil \frac{2 \times O}{Q_m} \right\rceil \quad \text{[Equation 7]}$$

Herein, O represents a bit size of the information data of the ACK/NACK or RI, and $Q_m$ corresponds to a bit size per symbol according to the modulation order. In case of the QPSK, $Q_m$ is equal to 2, in case of the 16QAM, $Q_m$ is equal to 4, and, in case of the 64QAM, $Q_m$ is equal to 6.

Meanwhile, in case of the ACK/NACK and the RI, the standard of a coding rate for the RM coding process is ⅓. Accordingly, the minimum value $Q'_{min}$ for the number of resource elements being allocated to the ACK/NACK or RI may be decided by using Equation 8 to Equation 10 shown below.

$$Q'_{min} = \left\lceil \frac{3 \times O}{Q_m} \right\rceil \quad \text{[Equation 8]}$$

$$Q'_{min} = \left\lceil \frac{2 \times O}{Q_m} - \frac{1}{2} \right\rceil \text{ or } Q'_{min} = \left\lceil \frac{2 \times O - Q_m/2}{Q_m} \right\rceil \quad \text{[Equation 9]}$$

$$Q'_{min} = \left\lceil \frac{2 \times O}{Q_m} - \frac{3}{4} \right\rceil \text{ or } Q'_{min} = \left\lceil \frac{2 \times O - (3Q_m/4)}{Q_m} \right\rceil \quad \text{[Equation 10]}$$

Table 4 to Table 7 shown below respectively correspond to examples of calculating the minimum value $Q'_{min}$ for the number of resource elements being allocated to the ACK/NACK or RI by using Equation 7 to Equation 10 presented above.

TABLE 4

| Info. bit size | REs for QPSK | REs for 16QAM | REs for 64QAM |
|---|---|---|---|
| 3 | 3 | 2 | 1 |
| 4 | 4 | 2 | 2 |
| 5 | 5 | 3 | 2 |
| 6 | 6 | 3 | 2 |
| 7 | 7 | 4 | 3 |
| 8 | 8 | 4 | 3 |
| 9 | 9 | 5 | 3 |
| 10 | 10 | 5 | 4 |
| 11 | 11 | 6 | 4 |

TABLE 5

| Info. bit size | REs for QPSK | REs for 16QAM | REs for 64QAM |
|---|---|---|---|
| 3 | 3 | 1 | 1 |
| 4 | 4 | 2 | 1 |
| 5 | 5 | 2 | 2 |
| 6 | 6 | 3 | 2 |
| 7 | 7 | 3 | 2 |
| 8 | 8 | 4 | 3 |
| 9 | 9 | 4 | 3 |
| 10 | 10 | 5 | 3 |
| 11 | 11 | 5 | 4 |

TABLE 6

| Info. bit size | REs for QPSK | REs for 16QAM | REs or 64QAM |
|---|---|---|---|
| 3 | 5 | 3 | 2 |
| 4 | 6 | 3 | 2 |
| 5 | 8 | 4 | 3 |
| 6 | 9 | 5 | 3 |
| 7 | 11 | 6 | 4 |
| 8 | 12 | 6 | 4 |
| 9 | 14 | 7 | 5 |
| 10 | 15 | 8 | 5 |
| 11 | 17 | 9 | 6 |

TABLE 7

| Info. bit size | REs for QPSK | REs for 16QAM | REs for 64QAM |
|---|---|---|---|
| 3 | 2 | 2 | 1 |
| 4 | 3 | 2 | 1 |
| 5 | 3 | 2 | 1 |
| 6 | 6 | 3 | 2 |
| 7 | 6 | 3 | 2 |
| 8 | 6 | 3 | 2 |
| 9 | 6 | 3 | 2 |
| 10 | 6 | 3 | 2 |
| 11 | 9 | 5 | 3 |

2) Also, in the first embodiment of the present invention, after the ACK/NACK or RI codes the RM coding, when the ACK/NACK or RI is punctured by the rate matching process, it may be considered to perform puncturing by a predetermined and specific order. More specifically, when the ACK/NACK or RI is allocated to a given number of resource elements, the allocation order may be decided by grouping the ACK/NACK or RI in 1-bit or 2-bit units or in units of a specific number of bits, so that the ACK/NACK or RI can be allocated to the resource elements by the decided order. For example, if the output data having the ACK/NACK or RI coded correspond to $c_0, c_1, \ldots, c_{31}$, the output data are realigned through a permutation function $\pi(i)=0, 1, \ldots, 31$, which corresponds to a predetermined rule, so that an optimal performance can be demonstrated when performing the puncturing process. Then, in accordance with the permuted order, the resource elements may be sequentially allocated, or the puncturing process may be sequentially performed, by the index order or by an inverse index order. More specifically, when 8 coded output data are allocated to the resource elements, the located data becomes $c_{\pi(0)}, c_{\pi(1)}, \ldots, c_{\pi(7)}$, instead of $c_0, c_1, \ldots, c_7$.

3) Furthermore, according to the first embodiment of the present invention, different $\beta_{offset}^{PUSCH}$ values may be used depending upon the information data size respective to the ACK/NACK and the RI. When puncturing the coded output data, i.e., the codeword by using the RM coding scheme, the influence of the puncturing process may vary depending upon the bit size of the information data. Therefore, depending upon the level of influence affecting the minimum distance of the codeword caused by the puncturing process, the $\beta_{offset}^{PUSCH}$ value may be configured differently. For example, when puncturing the codeword, a comparatively large $\beta_{offset}^{PUSCH}$ value is set up for the fastest bit size of the information data to have its minimum distance value be equal to 0.

Although the above-described processes 1) to 3) describe the process of setting up the minimum value of the number of resource elements being allocated to the UCI, in order to achieve the same object, a minimum bit size value of the coded output data after processing rate matching may also be set up. More specifically, the minimum value $Q'_{min}$ shown in Equation 5 may be configured in the number of resource elements as the minimum bit size value of the output data, as shown in Equation 11 below.

$$Q'_{min} = 2O \quad \text{[Equation 11]}$$

<Second Embodiment—When the Information Data Size is Equal to or Greater than 12 Bits>

In case the information data size of the ACK/NACK and the RI is equal to or greater than 12 bits, the PUSCH groups the information data to the same bit size or to a different bit size, which corresponds to at least two or more data sets. And, channel coding may be performed on each of the divided information data groups by using a (32,0) RM coding scheme, which is used in each PUSCH.

More specifically, when multiplexing the UCI, such as the RI or ACK/NACK, and the data in a multiple carrier environment, the information data bits of the UCI are divided into at least two or more group, and each group may be coded as a single codeword. In this case, since a (32,0) RM coding scheme using Table 1 may be applied, when a range of the bit size of the information data is between 3 bits and 11 bits, if the bit size of the information data included in each group is between 6 bits and 10 bits, then the (32,0) RM coding scheme, i.e., a dual RM coding scheme may be applied for each group. Hereinafter, a method for dividing the information data into group will first be described, and then a method for calculating the number of resource elements for allocating the coded information data and a method for performing rate matching, i.e., a coding chain, when applying the dual (32,0) RM coding scheme, will be described afterwards. Thereafter, a method for calculating a minimum number of resource elements that can be allocated for each codeword when applying the dual (32,0) RM coding scheme according to the first embodiment of the present invention will be described.

1) Information Data Grouping Method when Performing Dual RM Coding

First of all, a method of dividing information data having the size of 12 bits or more into groups in order to apply the dual (32,0) RM coding scheme will be described with reference to FIG. 18 and FIG. 19.

Figure 18:
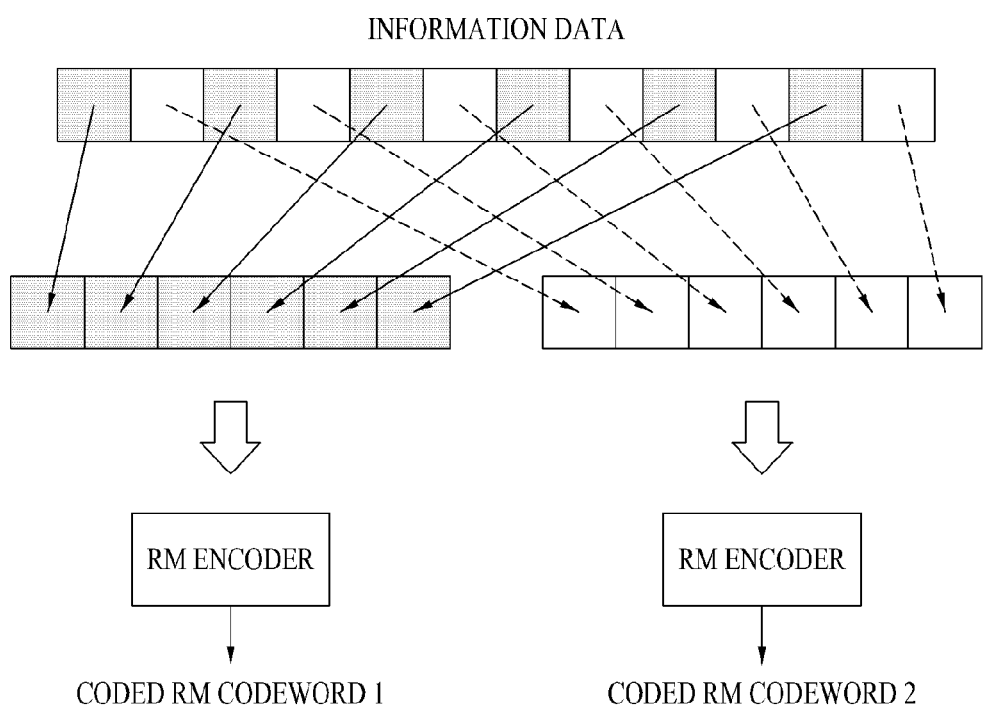
FIG. 18 illustrates a method of dividing information data into groups in order to apply a dual RM coding scheme according to a second embodiment of the present invention.

(1) FIG. 18 illustrates a method of dividing information data into groups in order to apply a dual (32,0) RM coding scheme according to a second embodiment of the present invention.

Referring to FIG. 18, the whole (or entire) information data may be sequentially allocated as the input data of each encoder used for the dual (32,0) RM coding scheme. For example, when the 12-bit information data $d_0, d_1, d_2, \ldots d_{11}$ is coded by two RM encoders, the information data being inputted to a first RM encoder may correspond to 6 bits $d_0, d_2, d_4, \ldots d_{10}$, which correspond to even-numbered information data bits. And, the information data being inputted to a second (32,0) RM encoder may correspond to 6 bits $d_1, d_3, d_5, \ldots, d_{11}$, which correspond to odd-numbered information data bits.

More specifically, in case the given information data corresponds to $o_0, o_1, o_2, \ldots, o_{Q-1}$, among the input data of the RM encoder $b_0, b_1, b_2, \ldots, b_{Q-1}$, if $b_0, b_1, b_2, \ldots, b_{\lceil Q/2 \rceil -1}$ and $b_{\lceil Q/2 \rceil}, b_{\lceil Q/2 \rceil+1}, b_{\lceil Q/2 \rceil+2}, \ldots, b_{Q-1}$ are respectively inputted to the first RM encoder and the second RM encoder, when i is an even number, then $b_{i/2} = o_i$. And, when i is an odd number then $b_{\lceil Q/2 \rceil + (i-1)/2} = o_i$.

Figure 19:
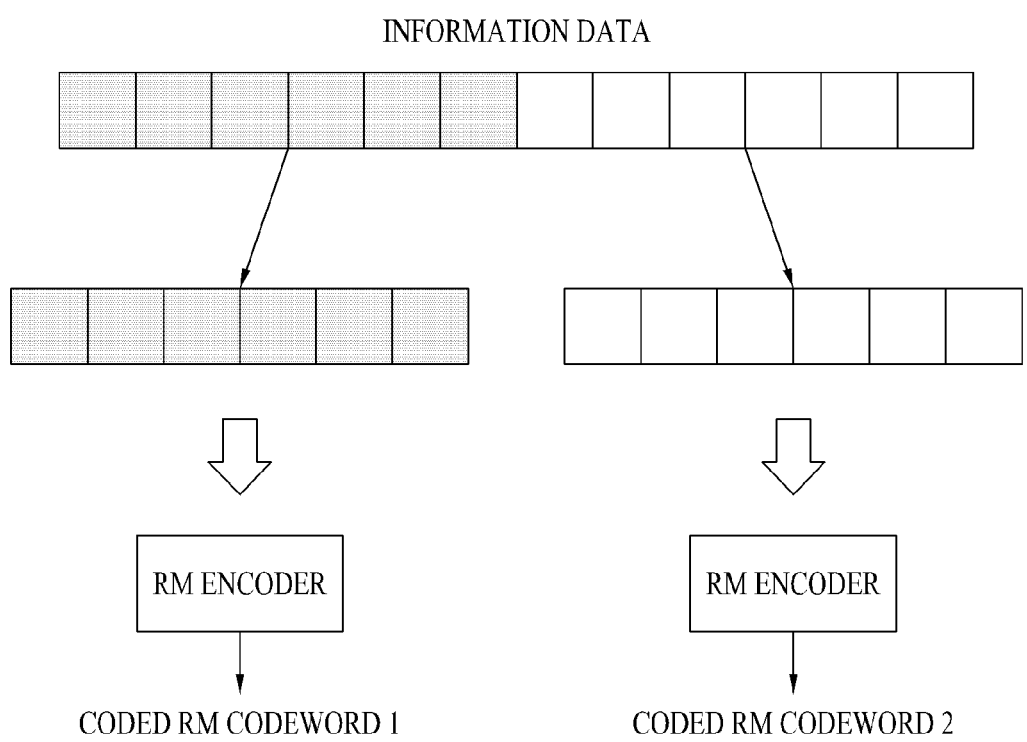
FIG. 19 illustrates another method of dividing information data into groups in order to apply a dual RM coding scheme according to a second embodiment of the present invention.

(2) FIG. 19 illustrates another method of dividing information data into groups in order to apply a dual (32,0) RM coding scheme according to a second embodiment of the present invention.

Referring to FIG. 19, a first half of the whole information data may be allocated as the information data being inputted to the first RM encoder, and a second half of the whole information data may be allocated as the information data being inputted to the second RM encoder. For example, when the 12-bit information data $d_0, d_1, d_2, \ldots d_{11}$ is coded by two RM encoders, 6 bits $d_0, d_1, d_2, \ldots, d_5$ of the information data may be inputted to the first RM encoder, and 6 bits $d_6, d_7, d_8, \ldots, d_{11}$ of the information data may be inputted to the second RM encoder.

Meanwhile, collectively referring to FIG. 18 and FIG. 19, when the bit size O of the whole information data corresponds to an odd number, (O+1)/2 bits may be allocated as the information data being inputted to the first RM encoder, and (O−1)/2 bits may be allocated as the information data being inputted to the second RM encoder. Alternatively, (O−1)/2 bits may be allocated as the information data being inputted to the first RM encoder, and (O+1)/2 bits may be allocated as the information data being inputted to the second RM encoder.

(3) Among the component carriers, information data corresponding to primary component carriers (primary CCs) may be configured as one group, and information data corresponding to other component carriers (CCs) may be configured as another group. Herein, the primary component carrier may correspond to a component carrier having a most significant index or a least significant index, or may correspond to a predetermined index. Alternatively, a component carrier having a most favorable channel status or having a least favorable channel status may also be configured as the primary component carrier. Furthermore, a component carrier having a largest bit size or a smallest bit size of the information data may be configured as the primary component carrier. And, in the aspects of coding rates and modulation orders, the primary component carrier may be configured by using the same method.

2) Coding Chain when Applying the Dual RM Coding Scheme (1) Hereinafter, a method for calculating a number of resource elements for allocating coded information data, when applying the dual RM coding scheme, will now be defined. When calculating the number of resource elements, the present invention proposes a method of calculating the number of resource elements by using Equation 1 and Equation 2, based upon the bit size of the whole information data, instead of the bit size of the information data being divided into a plurality of groups. More specifically, when the ACK/NACK and the RI are coded by using the dual RM coding scheme, the number of resource elements being allocated to each RM codeword is allocated by equally the number of resource elements, which is calculated from the given bit size O of the whole information data.

Accordingly, when the number of resource elements Q' calculated from the given bit size O of the whole information data corresponds to an even number, Q'/2 number of resource elements may be allocated to each codeword, each codeword being generated in accordance with the dual RM coding scheme.

Also, when the number of resource elements Q' calculated from the given bit size O of the whole information data corresponds to an odd number, (Q'+1)/2 number of resource elements may be allocated to a $1^{st}$ codeword, which is generated in accordance with the dual RM coding scheme, and (Q'−1)/2 number of resource elements may be allocated to a $2^{nd}$ codeword, which is also generated in accordance with the dual RM coding scheme. Alternatively, (Q'−1)/2 number of resource elements may be allocated to a $1^{st}$ codeword, and (Q'+1)/2 number of resource elements may be allocated to a $2^{nd}$ codeword.

(2) However, in the rate matching step using Equation 4, rate matching, i.e., puncturing may be individually performed on each codeword, each codeword being generated in accordance with the dual RM coding scheme, while matching the number and modulation order of the resource elements, wherein the resource elements are allocated to each codeword as described in 2).

Figure 20:
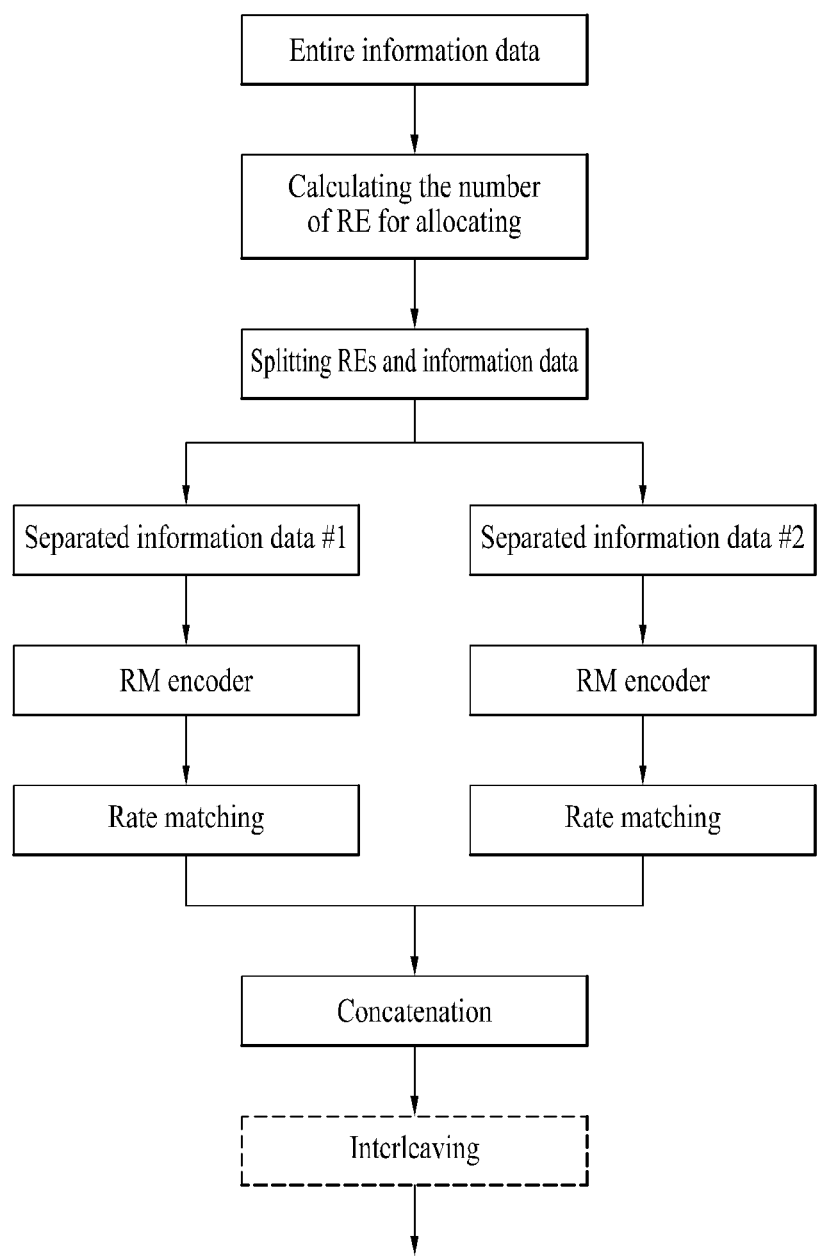
FIG. 20 illustrates a coding chain for dual RM coding according to the second embodiment of the present invention.

(3) FIG. 20 illustrates a coding chain for dual RM coding according to the second embodiment of the present invention.

Referring to FIG. 20, the coding chain for the dual RM coding according to the present invention may be recapitulated as a method of performing the dual RM coding scheme, which is proposed in the present invention, wherein a single resource element calculation is combined with individual rate matching processes.

More specifically, in case the information data size of the ACK/NACK and the RI is equal to or greater than 12 bits, the dual (32,0) RM coding scheme of the present invention may be applied, and, as described in 1), the whole information data may be grouped and divided into first ($1^{st}$) information data and second ($2^{nd}$) information data.

Subsequently, as described in (1) of 2), when calculating the number of resource elements that are to be allocated, the corresponding number of resource elements may be calculated based upon the bit size of the whole information data, instead of the bit size of the information data being divided into a plurality of groups. Then, the calculated number of resource elements is distributed to each RM encoder. Afterwards, rate matching may be performed on the codewords outputted from each encoder, in accordance with the given resource size. Thereafter, the processed data may be concatenated. Furthermore, although an interleaver may be applied to the concatenated data, the interleaver may be omitted in some cases.

3) Method for Deciding the Minimum Number of Resource Elements when Applying the Dual RM Coding Scheme Meanwhile, as described in the first embodiment of the present invention, in the dual RM coding scheme, a minimum value is also required to be configured in the number of resource elements being allocated to the UCI, i.e., the ACK/NACK or RI. Therefore, in the dual RM coding scheme according to the present invention, the minimum value for the number of resource elements being allocated to the ACK/NACK and the RI may be configured by adding the minimum number of resource elements corresponding to each of the grouped information data bits.

More specifically, if the equations for calculating the minimum number of resource elements respective to O bits of the information data, i.e., Equation 5 to Equation 7 are referred to as f(O) for simplicity, the equation for calculating the minimum number of resource elements that are to be allocated to each codeword, during the dual RM coding process, may correspond to f(O/2). And, the minimum number of resource elements that are allocated to the whole (or entire) ACK/NACK and RI may correspond to f(O/2)+f(O/2). As a simple example, the minimum number of resource elements that are allocated to the 12-bit sized information data corresponds to f(6)+f(6) instead of f(12).

Meanwhile, in case the size of the information data corresponds to an odd number, the size of each information data group that is used for calculating the minimum number of resource elements may be allocated with (O+1)/2 bits for the first codeword and may be allocated with (O−1)/2 bits for the second codeword. Alternatively, the minimum number of resource elements may be allocated with (O−1)/2 bits for the first codeword and may be allocated with (O+1)/2 bits for the second codeword. In this case, the minimum number of resource elements being allocated to the whole ACK/NACK and RI corresponds to f((O+1)/2)+f((O−1)/2). For example, the minimum number of resource elements being calculated for the 13-bit information data corresponds to f(7)+f(6), instead of f(13)

Therefore, Equation 7 may be changed to Equation 12 and Equation 13 shown below.

$$Q'_{min} = 2 \times \left\lceil \frac{2 \times \frac{O}{2}}{Q_m} \right\rceil = 2 \times \left\lceil \frac{O}{Q_m} \right\rceil \qquad \text{[Equation 12]}$$

(wherein $O$ is an even number)

$$Q'_{min} = \left\lceil \frac{2 \times \frac{O+1}{2}}{Q_m} \right\rceil + \left\lceil \frac{2 \times \frac{O-1}{2}}{Q_m} \right\rceil = \left\lceil \frac{O+1}{Q_m} \right\rceil + \left\lceil \frac{O-1}{Q_m} \right\rceil \qquad \text{[Equation 13]}$$

(wherein $O$ is an odd number)

A combination of Equation 12 and Equation 13 may be expressed as Equation 14 shown below.

$$Q'_{min} = \left\lceil \frac{2 \times \lceil O/2 \rceil}{Q_m} \right\rceil + \left\lceil \frac{2 \times (O - \lceil O/2 \rceil)}{Q_m} \right\rceil = \qquad \text{[Equation 14]}$$

$$\left\lceil \frac{2 \times \lceil O/2 \rceil}{Q_m} \right\rceil + \left\lceil \frac{2 \times \lfloor \frac{O}{2} \rfloor}{Q_m} \right\rceil$$

If the whole information data are divided into N number of groups so that the RM coding scheme can be individually applied, and if the size of the information data being inputted during each RM coding process is referred to as $O_i$, the minimum number of resource elements being allocated to the ACK/NACK and the RI corresponds to $$\sum_{i=0}^{N-1} f(O_i).$$

Meanwhile, among the modulation orders of the transmission block, wherein the PUSCH transmission is performed, $Q_m$ may correspond to a lower modulation order. More specifically, when the modulation order of the first transmission block (TB) is QPSK, and when the modulation order of the second TB is 16QAM, $Q_m$ is equal to 2, which corresponds to a QPSK value respective to the lower modulation order among the modulation orders of two transmission blocks. Alternatively, $Q_m$ may correspond to an average value of the modulation order values of the transmission block, wherein the PUSCH transmission is performed. More specifically, when the modulation order of the first transmission block (TB) is QPSK, and when the modulation order of the second TB is 16QAM, $Q_m$ is equal to 3, which corresponds to the average value of the modulation orders of the two transmission blocks. Furthermore, among the modulation orders of the transmission block, wherein the PUSCH transmission is performed, $Q_m$ may correspond to a higher modulation order. More specifically, when the modulation order of the first transmission block (TB) is QPSK, and when the modulation order of the second TB is 16QAM, $Q_m$ is equal to 4, which corresponds to a 16QAM value respective to the higher modulation order among the modulation orders of two transmission blocks.

<Third Embodiment—Method of Mapping Coded Information Data to the Resource Elements>

When mapping the coded UCI to the PUSCH according to the first embodiment and the second embodiment of the present invention, each of the coded codewords may be mapped to one resource element or to a specific number of resource elements by a virtual carrier order.

When performing sequential mapping, the coded codeword is mapped from a least significant (or lowest) index of the virtual subcarrier in an increasing direction of the index. For example, when performing dual RM coding, the first codeword may be mapped starting from an odd-numbered virtual subcarrier of the least significant index to each odd-numbered virtual subcarrier. And, the second codeword may be mapped starting from an even-numbered virtual subcarrier of the least significant index to each even-numbered virtual subcarrier.

Additionally, a mapping method may also be performed in a time-based order. For example, when the allocated resource elements correspond to the $2^{nd}$, $4^{th}$, $9^{th}$, and $11^{th}$ symbols, respectively, the first codeword may be mapped to the $2^{nd}$ and $9^{th}$ symbols, and the second codeword may be mapped to the $4^{th}$ and $11^{th}$ symbols. Alternatively, the first codeword may be mapped to resource elements corresponding to two symbols, and the second codeword may be mapped to resource elements corresponding to the remaining symbols.

Figure 21:
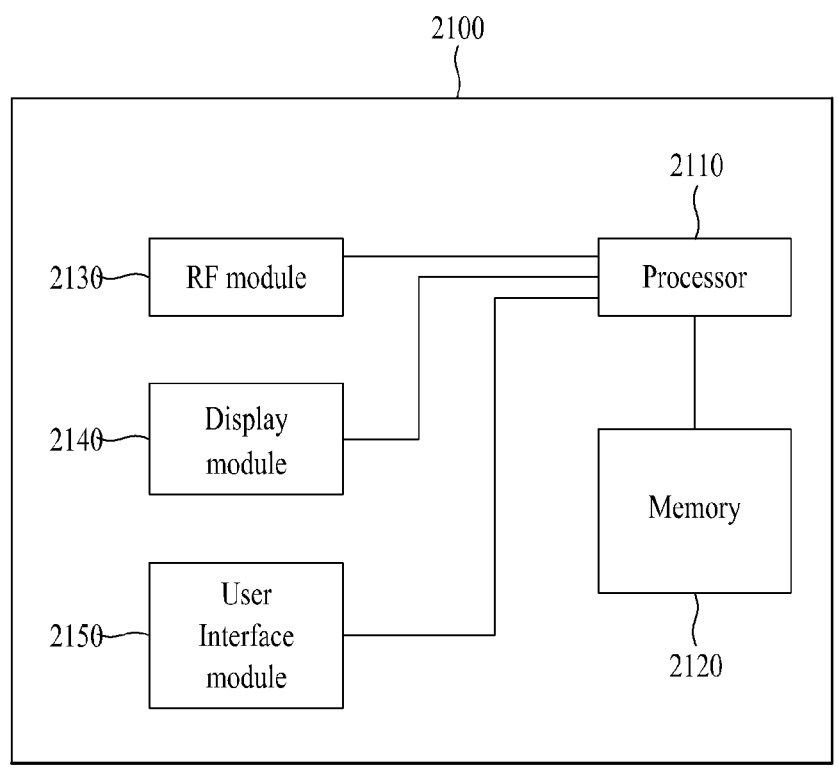
FIG. 21 illustrates a block view showing a structure of a communication apparatus according to an embodiment of the present invention.

FIG. 21 illustrates a block view showing a structure of a communication apparatus according to an embodiment of the present invention.

Referring to FIG. 21, a communication apparatus 2100 includes a processor 2110, a memory 2120, an RF module 2130, a display module 2140, and a user interface module 2150.

The communication apparatus 2100 is an exemplary illustration provided to simplify the description of the present invention. Also, the communication apparatus 2100 may further include necessary modules. Also, in the communication apparatus 2100 some of the modules may be divided into more segmented modules. Referring to FIG. 21, an example of the processor 2110 is configured to perform operations according to the embodiment of the present invention. More specifically, for the detailed operations of the processor 2110, reference may be made to the description of the present invention shown in FIG. 1 to FIG. 20.

The memory 2120 is connected to the processor 2110 and stores operating systems, applications, program codes, data, and so on. The RF module 2130 is connected to the processor 2110 and performs a function of converting baseband signals to radio (or wireless) signals or converting radio signals to baseband signals. In order to do so, the RF module 2130 performs analog conversion, amplification, filtering, and frequency uplink conversion or inverse processes of the same. The display module 2140 is connected to the processor 2110 and displays diverse information. The display module 2140 will not be limited only to the example given herein. In other words, generally known elements, such as Liquid Crystal Display (LCD), Light Emitting Diode (LED), Organic Light Emitting Diode (OLED) may also be used as the display module 2140. The user interface module 2150 is connected to the processor 2110, and the user interface module 2150 may be configured of a combination of generally known user interfaces, such as keypads, touchscreens, and so on.

The above-described embodiments of the present invention correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention. Furthermore, it is apparent that claims that do not have any explicit citations within the scope of the claims of the present invention may either be combined to configure another embodiment of the present invention, or new claims may be added during the amendment of the present invention after the filing for the patent application of the present invention.

In the description of the present invention, the embodiments of the present invention have been described by mainly focusing on the data transmission and reception relation between the base station and the terminal (or user equipment). Occasionally, in the description of the present invention, particular operations of the present invention that are described as being performed by the base station may also be performed by an upper node of the base station. More specifically, in a network consisting of multiple network nodes including the base station, it is apparent that diverse operations that are performed in order to communicate with the terminal may be performed by the base station or b network nodes other than the base station. Herein, the term 'Base Station (BS)' may be replaced by other terms, such as fixed station, Node B, eNode B (eNB), Access Point (AP), and so on.

The above-described embodiments of the present invention may be implemented by using a variety of methods. For example, the embodiments of the present invention may be implemented in the form of hardware, firmware, or software, or in a combination of hardware, firmware, and/or software.

In case of implementing the embodiments of the present invention in the form of hardware, the method according to the embodiments of the present invention may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro controllers, micro processors, and so on.

In case of implementing the embodiments of the present invention in the form of firmware or software, the method according to the embodiments of the present invention may be implemented in the form of a module, procedure, or function performing the above-described functions or operations. A software code may be stored in a memory unit and driven by a processor. Herein, the memory unit may be located inside or outside of the processor, and the memory unit may transmit and receive data to and from the processor by using a wide range of methods that have already been disclosed.

As described above, the method for transmitting control information in wireless communication system and apparatus therefore according to the present invention are advantageous in that, in a wireless communication system, a transmitting end may effectively encode the control information according to the present invention. Also, the method for transmitting control information in wireless communication system and apparatus therefore according to the present invention may be applied to wireless communication systems. Most particularly, the present invention may be applied to wireless mobile communication apparatuses that are used for cellular systems.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents.

Therefore, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving information data by using an RM (Reed-Muller) coding scheme at a reception device in a wireless communication system, the method comprising:
   receiving, by the reception device, a signal from a transmission device;
   dividing, by the reception device, the signal into a first signal and a second signal,
   wherein the first signal and the second signal are rate-matched by the transmission device such that the first signal corresponds to a first number $Q_1'$ of resource elements for first information data and the second signal corresponds to a second number $Q_2'$ of resource elements for second information data;
   decoding, by the reception device, the first and second signals to obtain the first and second information data, wherein the first and second information data are encoded by a Reed-Muller (RM) coding scheme; and
   combining, by the reception device, the first and second information data,
   wherein a bit size O of the combined information data is equal to or larger than a predetermined number,
   wherein the first number $Q_1'$ of resource elements for the first information data and the second number $Q_2'$ of resource elements for the second information data are configured by dividing a number $Q'$ of resource elements equally, and
   wherein the number $Q'$ of resource elements is configured based upon the bit size O of the combined information data.

2. The method of claim 1,
   wherein a size $O_1$ of the first information data corresponds to $$\left\lceil \frac{O}{2} \right\rceil$$

bits, and
   wherein a size $O_2$ of the second information data corresponds to $$O - \left\lceil \frac{O}{2} \right\rceil = \left\lfloor \frac{O}{2} \right\rfloor$$

bits.

3. The method of claim 1,
   wherein the predetermined number corresponds to 12 bits, and
   wherein each bit size of the coded first information data and the coded second information data corresponds to 32 bits.

4. The method of claim 1,
   wherein the signal corresponds to UCI (Uplink Control Information), and
   wherein the Uplink Control Information is received through an uplink shared channel.

5. The method of claim 4, wherein the Uplink Control Information includes HARQ (Hybrid Automatic Retransmission reQuest)-ACK/NACK (Acknowledgment/Negative Acknowledgment) data or an RI (Rank Indicator).

6. The method of claim 1, wherein, when the number $Q'$ of resource elements is an even number, each of the first number $Q_1'$ of resource elements and the second number $Q_2'$ of resource elements corresponds to $$\frac{Q'}{2}.$$

7. The method of claim 1, wherein, when the number $Q'$ of resource elements is an odd number, the first number $Q_1'$ of resource elements corresponds to $(Q'+1)/2$, and the second number $Q_2'$ of resource elements corresponds to $(Q'-1)/2$.

8. A receiving apparatus of a wireless communication system, the receiving apparatus comprising:
   a receiver configured to receive a signal from a transmission apparatus;

a processor operatively connected to the receiver and configured to:
  receive a signal from a transmission device;
  divide the signal into a first signal and a second signal, wherein the first signal and the second signal are rate-matched by the transmission device such that the first signal corresponds to a first number $Q_1'$ of resource elements for first information data the second signal corresponds to a second number $Q_2'$ of resource elements for second information data;
  decode the first and second signals to obtain the first and second information data,
  wherein the first and second information data are encoded by a Reed-Muller (RM) coding scheme; and
  combine the first and second information data,
  wherein a bit size O of the combined information data is equal to or larger than a predetermined number,
  wherein the first number $Q_1'$ of resource elements for the first information data and the second number $Q_2'$ of resource elements for the second information data are configured by dividing a number $Q'$ of resource elements equally, and
  wherein the number $Q'$ of resource elements is configured based upon the bit size O of the combined information data.

9. The receiving apparatus of claim 8, wherein a size $O_1$ of the first information data corresponds to $$\left\lceil \frac{O}{2} \right\rceil$$

bits, and
wherein a size $O_2$ of the second information data corresponds to $$O - \left\lceil \frac{O}{2} \right\rceil = \left\lfloor \frac{O}{2} \right\rfloor$$

bits.

10. The receiving apparatus of claim 8,
wherein the predetermined number corresponds to 12 bits, and
wherein each bit size of the coded first information data and the coded second information data corresponds to 32 bits.

11. The receiving apparatus of claim 8,
wherein the signal corresponds to UCI (Uplink Control Information), and
wherein the Uplink Control Information is transmitted through an uplink shared channel.

12. The receiving apparatus of claim 11, wherein the Uplink Control Information includes HARQ (Hybrid Automatic Retransmission reQuest)-ACK/NACK (Acknowledgment/Negative Acknowledgment) data or an RI (Rank Indicator).

13. The receiving apparatus of claim 8, wherein, when the number $Q'$ of resource elements is an even number, each of the first number $Q_1'$ of resource elements and the second number $Q_2'$ of resource elements corresponds to $$\frac{Q'}{2}.$$

14. The receiving apparatus of claim 8, wherein, when the number $Q'$ of resource elements is an odd number, the first number $Q_1'$ of resource elements corresponds to $(Q'+1)/2$, and the second number $Q_2'$ of resource elements corresponds to $(Q'-1)/2$.

* * * * *